(12) United States Patent
Yang et al.

(10) Patent No.: US 8,879,283 B2
(45) Date of Patent: Nov. 4, 2014

(54) SYSTEM AND METHOD PROVIDING PROTECTION IN THE EVENT OF CURRENT SENSING FAILURE FOR POWER CONVERTER

(75) Inventors: Dongze Yang, Shanghai (CN); Yaming Cao, Shanghai (CN); Yunchao Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 708 days.

(21) Appl. No.: 12/912,050

(22) Filed: Oct. 26, 2010

(65) Prior Publication Data

US 2011/0267853 A1 Nov. 3, 2011

Related U.S. Application Data

(60) Provisional application No. 61/258,522, filed on Nov. 5, 2009.

(51) Int. Cl.
*H02M 3/335* (2006.01)
*H02M 1/32* (2007.01)
*H02M 1/00* (2006.01)

(52) U.S. Cl.
CPC ............ *H02M 3/33507* (2013.01); *H02M 1/32* (2013.01); *H02M 2001/0009* (2013.01)
USPC .................. 363/21.13; 363/21.12; 363/21.15; 363/21.18

(58) Field of Classification Search
USPC ..................... 363/56.01–56.12, 21.12–21.15, 363/21.17–21.18
See application file for complete search history.

(56) References Cited

U.S. PATENT DOCUMENTS

| | | | | |
|---|---|---|---|---|
| 4,281,218 | A * | 7/1981 | Chuang et al. | 370/435 |
| 6,272,029 | B1 * | 8/2001 | Hirose | 363/59 |
| 7,345,895 | B2 * | 3/2008 | Zhu et al. | 363/21.12 |
| 7,420,791 | B1 * | 9/2008 | Dong et al. | 361/90 |
| 7,952,893 | B2 * | 5/2011 | Hiasa | 363/21.01 |
| 7,990,740 | B1 * | 8/2011 | Notohamiprodjo et al. | 363/59 |
| 2002/0141209 | A1 * | 10/2002 | Bridge | 363/89 |
| 2005/0134250 | A1 * | 6/2005 | Kim et al. | 323/299 |
| 2011/0234255 | A1 * | 9/2011 | Chobot | 324/764.01 |

* cited by examiner

*Primary Examiner* — Matthew Nguyen
*Assistant Examiner* — Henry Lee, III
(74) *Attorney, Agent, or Firm* — Jones Day

(57) ABSTRACT

System and method for protecting a power converter. The system includes a first comparator configured to receive a first threshold signal and a first signal and to generate a first comparison signal. The first signal is associated with an input current for a power converter. Additionally, the system includes a second comparator configured to receive a second threshold signal and the first signal and to generate a second comparison signal. The second threshold signal is different from the first threshold signal in magnitude. Moreover, the system includes a first detection component configured to receive at least the second comparison signal, detect the second comparison signal only if one or more predetermined conditions are satisfied, and generate a first detection signal based on at least information associated with the detected second comparison signal.

11 Claims, 17 Drawing Sheets

SYSTEM AND METHOD PROVIDING PROTECTION IN THE EVENT OF CURRENT SENSING FAILURE FOR POWER CONVERTER

1. CROSS-REFERENCES TO RELATED APPLICATIONS

This application claims priority to U.S. Provisional No. 61/258,522, filed Nov. 5, 2009, commonly assigned, incorporated by reference herein for all purposes.

2. BACKGROUND OF THE INVENTION

The present invention is directed to integrated circuits. More particularly, the invention provides a control system and method for over-current protection in the event of current sensing failures. Merely by way of example, the invention has been applied to a power converter. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often use pulse-width-modulated (PWM) or pulse-frequency-modulated mechanisms. For example, a PWM switch-mode converter is an offline flyback converter or a forward converter. These modulation mechanisms are usually implemented with a switch-mode controller including various protection components. These components can provide over-voltage protection, over-temperature protection, over-current protection (OCP), and over-power protection (OPP). These protections can often prevent the power converters and connected circuitries from suffering permanent damage.

FIG. 1 is a simplified conventional switch-mode power converter with over-current protection. A switch-mode power converter 100 includes an OCP comparator 110, a PWM controller component 120, a gate driver 130, a power switch 140, resistors 150, 152, 154, and 156, a primary winding 160, a secondary winding 162, an isolated feedback component 170, and a leading-edge-blanking component 192. The OCP comparator 110, the PWM controller component 120, the gate driver 130, and the leading-edge-blanking component 192 are parts of a chip 180 for PWM control, which includes terminals 182, 184, 186 and 188. Additionally, the PWM controller component 120 includes a PWM comparator 124 and a logic controller 126. As an example, the switch-mode power converter 100 is a conventional PWM flyback power converter.

As shown in FIG. 1, the PWM controller component 120 generates a PWM signal 122, which is received by the gate driver 130. In response, the gate driver 130 sends a gate signal 132 to the power switch 140 through the terminal 184. Accordingly, the power switch 140 adjusts the current 164 flowing through the primary winding 160. For example, if the power switch 140 is turned on, the power switch 140 is closed, allowing the current 164 to flow through the primary winding 160. In another example, if the power switch is turned off, the power switch 140 is open, thus not allowing the current 164 to flow through the primary winding 160.

The current 164 is sensed by the resistor 150 and converted into a current sensing signal 114 (e.g., $V_{cs}$) through the terminal 186 and the leading-edge-blanking component 192. The current sensing signal 114 is received by the OCP comparator 110 and compared with an over-current threshold signal 112 (e.g., $V_{th\_oc}$). In response, the OCP comparator 110 sends an over-current control signal 116 to the PWM controller component 120. When the current of the primary winding is greater than a limiting level, the PWM controller component 120 turns off the power switch 140 and shuts down the switch-mode power converter 100, thus limiting the current 164 flowing through the primary winding 160 and protecting the switch-mode power converter 100.

More specifically, the output voltage of the secondary winding 162 is sensed by the isolated feedback component 170. For example, the isolated feedback component 170 includes an error amplifier and an opto-coupler. In response, the isolated feedback component 170 sends a feedback signal 123 to the PWM comparator 124 through the terminal 188. The PWM comparator 124 also receives the current sensing signal 114 and generates a PWM comparator output signal 125. The PWM comparator output signal 125 is received by the logic controller 126, which generates the PWM signal 122 based on at least information associated with the PWM comparator output signal 125.

FIG. 2 is a simplified diagram showing the conventional chip 180 for PWM control. The chip 180 includes the OCP comparator 110, the PWM comparator 124, the logic controller 126, the gate driver 130, the leading-edge-blanking component 192, a power-on-reset and under-voltage-lockout component 210, an internal power supply 220, a reference voltage and current generator 230, a clock and ramp signal generator 240, and a summation component 250. Additionally, the chip 180 also includes terminals 182, 184, 186, 188, 202 and 204.

As shown in FIG. 2, under normal operation, in each cycle, the current sensing signal 114 ramps up as the current 164 increase with time. The ramping-up slope of the current sensing signal 114 is $$\text{Slope} = \frac{V_{in} \times R_s}{L_p} \qquad \text{(Equation 1)}$$

where $V_{in}$ represents an input voltage at a node 190, $R_s$ represents the resistance value of the resistor 150, and $L_p$ represents the inductance value of the primary winding 160.

The current sensing signal 114 is added to a ramp signal 244 by the summation component 250. The ramp signal 244 is generated by the clock and ramp signal generator 240, which also outputs a clock signal 242. The summation component 250 generates a summation signal 252, which is received by the PWM comparator 124. The PWM comparator 124 compares the summation signal 252 with the feedback signal 123 and outputs the PWM comparator output signal 125. The PWM comparator output signal 125 is received by the logic controller 126, which also receives a clock signal 242 and the over-current control signal 116.

For example, if the PWM comparator output signal 125 is at the logic low level, the summation signal 252 is larger than the feedback signal 123 in magnitude, and the power switch 140 is turned off. In another example, if the over-current control signal 116 is at the logic low level, the current sensing signal 114 is larger than the over-current threshold signal 112 (e.g., $V_{th\_oc}$) in magnitude, and the power switch 140 is turned off.

FIG. 3 shows simplified conventional timing diagrams and waveforms for the switch-mode power converter 100 where the power switch 140 is turned off in response to the PWM comparator output signal 125. Curves 344, 342, 352, and 332 represent the signals 244, 242, 252, and 132 as functions of time respectively. When the summation signal 252 (corresponding to the curve 352) exceeds the feedback signal 123 (e.g., $V_{FB}$) in magnitude, the gate signal 132 (corresponding to the curve 332) changes from the logic high level to the logic low level, causing the power switch 140 to be turned off.

FIG. 4 shows simplified conventional timing diagrams and waveforms for the switch-mode power converter 100 where the power switch 140 is turned off in response to the current sensing signal 114. Curves 444, 442, 414, and 432 represent the signals 244, 242, 114, and 132 as functions of time respectively. When the current sensing signal 114 (corresponding to the curve 414) exceeds the over-current threshold signal 112 (e.g., $V_{th\_oc}$) in magnitude, the gate signal 232 (corresponding to the curve 432) changes from the logic high level to the logic low level, causing the power switch 140 to be turned off.

In more detail, the current 164 flowing through the primary winding 160 is limited to:

$$I_{max} = \frac{V_{th\_OC}}{R_s} \qquad \text{(Equation 2)}$$

where $I_{max}$ is the predetermined maximum magnitude for the current 164. Additionally, $V_{th\_oc}$ represents the magnitude of the over-current threshold signal 112, and $R_s$ represents the resistance value of the resistor 150. As discussed above, the current sensing signal 114 (corresponding to the curve 414) ramps up when the power switch 140 is turned on. If the current sensing signal 114 exceeds the predetermined $V_{th\_oc}$, the over-current control signal 116 changes from the logic high level to the logic low level. As a result, the power switch 140 is turned off, thus limiting the current that flows through the primary winding 160 and preventing the switch-mode power converter 100 from being damaged by excessive current and voltage stress.

But the mechanism of over-current protection (OCP) as shown in FIGS. 1-4 usually cannot function properly if the sensing of the current 164 flowing through the primary winding 160 fails. For example, if the resistor 150 becomes shorted or if the terminal 186 becomes hard shorted with zero impedance or soft shorted with very low impedance to the ground, the current sensing signal 114 would become very small or nearly zero. The current sensing signal 114 cannot accurately represent the magnitude of the current 164, thus allowing excessively large magnitude of the current 164. The excessive current flowing through the primary winding 160 can cause damage to the switch-mode power converter 100 due to excessive current and voltage stress at switching or thermal run-away at operation. For example, the excessive current can cause the primary winding 160 to saturate. In another example, the rectifier components at the transformer secondary side may be subject to permanent damage and even fire due to excessively high voltage and current stress at operation.

Hence it is highly desirable to improve the techniques of over-current protection (OCP).

3. BRIEF SUMMARY OF THE INVENTION

The present invention is directed to integrated circuits. More particularly, the invention provides a control system and method for over-current protection in the event of current sensing failures. Merely by way of example, the invention has been applied to a power converter. But it would be recognized that the invention has a much broader range of applicability.

According to one embodiment, a system for protecting a power converter includes a first comparator configured to receive a first threshold signal and a first signal and to generate a first comparison signal. The first signal is associated with an input current for a power converter. Additionally, the system includes a second comparator configured to receive a second threshold signal and the first signal and to generate a second comparison signal. The second threshold signal is different from the first threshold signal in magnitude. Moreover, the system includes a first detection component configured to receive at least the second comparison signal, detect the second comparison signal only if one or more predetermined conditions are satisfied, and generate a first detection signal based on at least information associated with the detected second comparison signal. Also, the system includes a switch signal generator coupled to at least the first detection component and configured to generate a switch signal for controlling a switch for adjusting the input current for the power converter based on at least information associated with the first comparison signal and the first detection signal. The switch signal generator is further configured to generate the switch signal to turn off the switch if the first comparison signal indicates the first signal is larger than the first threshold signal in magnitude, and the switch signal generator is further configured to generate the switch signal to turn off the switch if the first detection signal indicates the first signal is smaller than the second threshold signal in magnitude.

According to another embodiment, a system for protecting a power converter includes a first comparator configured to receive a first threshold signal and a first signal and to generate a first comparison signal. The first signal is associated with an input current for a power converter. Additionally, the system includes a second comparator configured to receive a second threshold signal and the first signal and to generate a second comparison signal. The second threshold signal is different from the first threshold signal in magnitude. Moreover, the system includes a detection and delay component configured to receive at least the second comparison signal, detect, with or without a predetermined delay of time, the second comparison signal only if one or more predetermined conditions are satisfied, process information associated with the detected second comparison signal, and generate a first detection signal based on at least information associated with the corresponding detected second comparison signal before the predetermined delay of time. Also, the system includes a switch signal generator coupled to at least the detection and delay component and configured to generate a switch signal for controlling a switch for adjusting the input current for the power converter based on at least information associated with the first comparison signal and the first detection signal. The switch signal generator is further configured to generate the switch signal to turn off the switch if the first comparison signal indicates the first signal is larger than the first threshold signal in magnitude, and the switch signal generator is further configured to generate the switch signal to turn off the switch if the first detection signal indicates the first signal is smaller than the second threshold signal in magnitude before the predetermined delay of time.

According to yet another embodiment, a method for protecting a power converter includes receiving a first signal, a first threshold signal, and a second threshold signal. The first signal is associated with an input current for a power converter, and the second threshold signal is different from the first threshold signal in magnitude. Additionally, the method includes generating a first comparison signal based on at least information associated with the first signal and the first threshold signal, and generating a second comparison signal based on at least information associated with the first signal and the second threshold signal. Moreover, the method includes receiving the second comparison signal, detecting the second comparison signal only if one or more predetermined conditions are satisfied, generating a first detection signal based on at least information associated with the detected second comparison signal, processing information associated with the first comparison signal and the first detection signal, and generating a switch signal for controlling a switch for adjusting the input current for the power converter based on at least information associated with the first comparison signal and the first detection signal. The process for generating a switch signal for controlling a switch includes generating the switch signal to turn off the switch if the first comparison signal indicates the first signal is larger than the first threshold signal in magnitude, and generating the switch signal to turn off the switch if the first detection signal indicates the first signal is smaller than the second threshold signal in magnitude.

According to yet another embodiment, a method for protecting a power converter includes receiving a first signal, a first threshold signal, and a second threshold signal. The first signal is associated with an input current for a power converter, and the second threshold signal is different from the first threshold signal in magnitude. Additionally, the method includes generating a first comparison signal based on at least information associated with the first signal and the first threshold signal, generating a second comparison signal based on at least information associated with the first signal and the second threshold signal, receiving the second comparison signal, detecting, with or without a predetermined delay of time, the second comparison signal only if one or more predetermined conditions are satisfied, processing information associated with the detected second comparison signal, and generating a first detection signal based on at least information associated with the corresponding detected second comparison signal before the predetermined delay of time. Moreover, the method includes processing information associated with the first comparison signal and the first detection signal, and generating a switch signal for controlling a switch for adjusting the input current for the power converter based on at least information associated with the first comparison signal and the first detection signal. The process for generating a switch signal for controlling a switch includes generating the switch signal to turn off the switch if the first comparison signal indicates the first signal is larger than the first threshold signal in magnitude, and generating the switch signal to turn off the switch if the first detection signal indicates the first signal is smaller than the second threshold signal in magnitude before the predetermined delay of time.

Many benefits are achieved by way of the present invention over conventional techniques. Certain embodiments of the present invention can protect a switch-mode power converter even if the current sensing mechanism fails. Some embodiments of the present invention provide a protection mechanism that limits the on-time of a power switch and thus limit the current that flows through a primary winding, even if the current sensing mechanism fails. For example, if the current sensing mechanism fails, the switch-mode power converter enters the shut down mode.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides a control system and method for over-current protection in the event of current sensing failures. Merely by way of example, the invention has been applied to a power converter. But it would be recognized that the invention has a much broader range of applicability.

Figure 1:
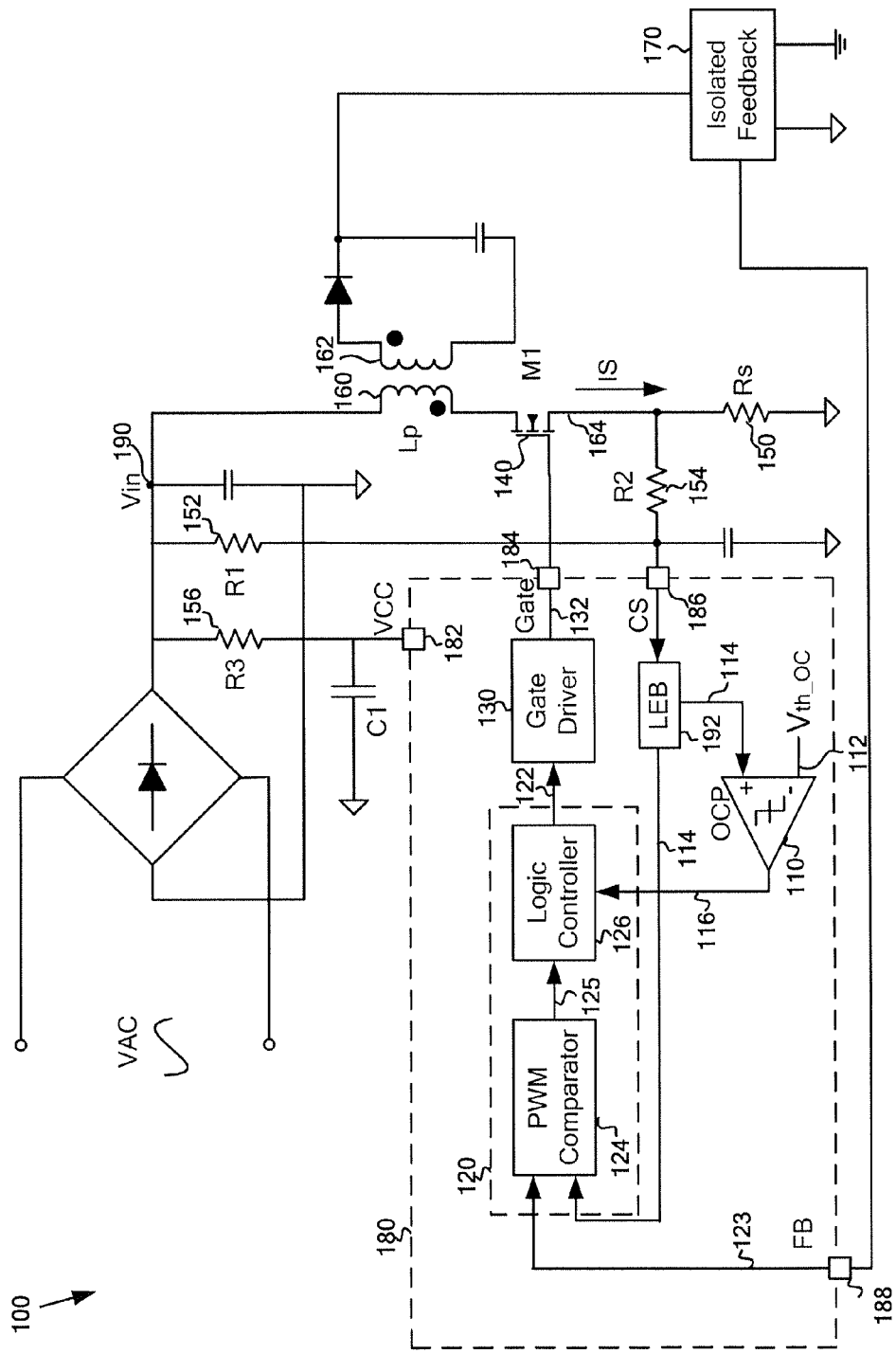
FIG. 1 is a simplified conventional switch-mode power converter with over-current protection.
Figure 2:
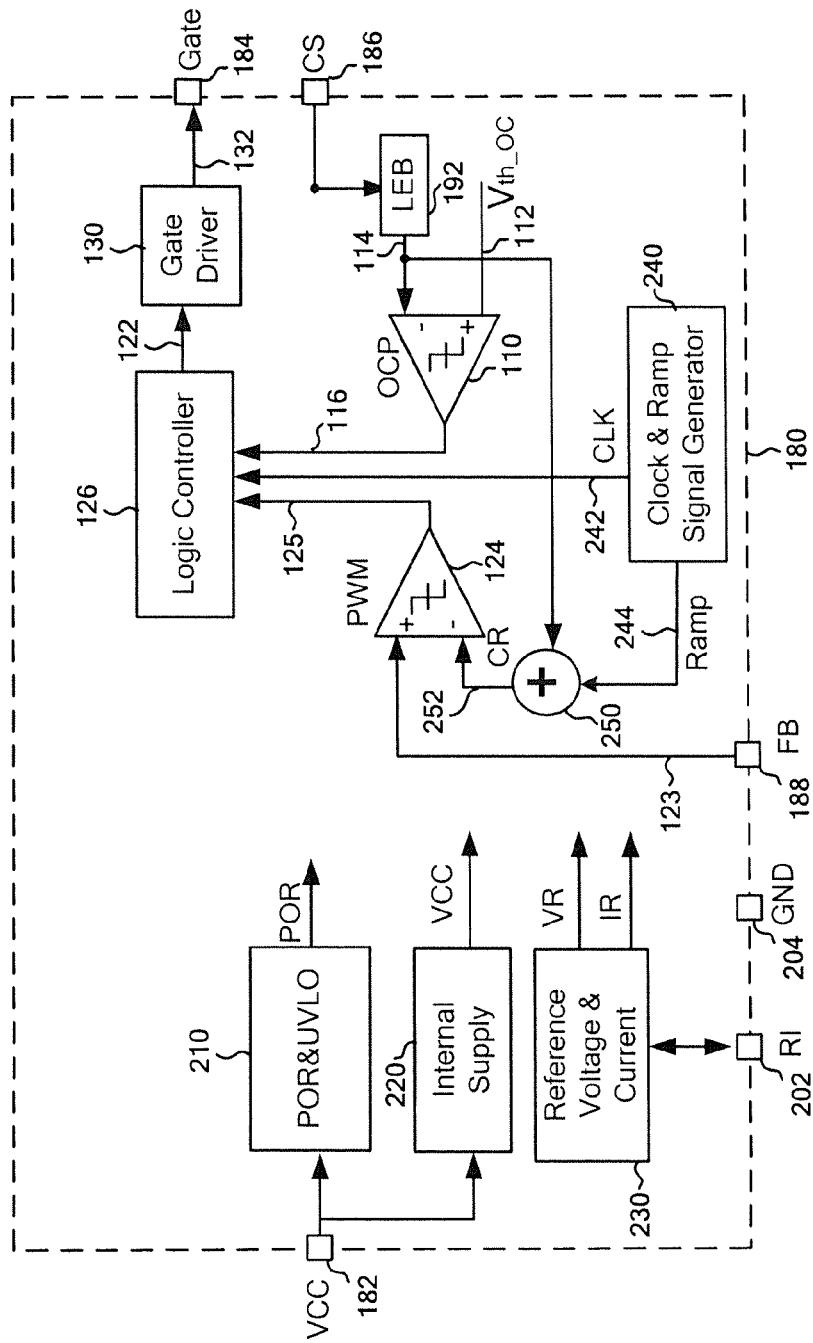
FIG. 2 is a simplified diagram showing the conventional chip for PWM control.
Figure 3:
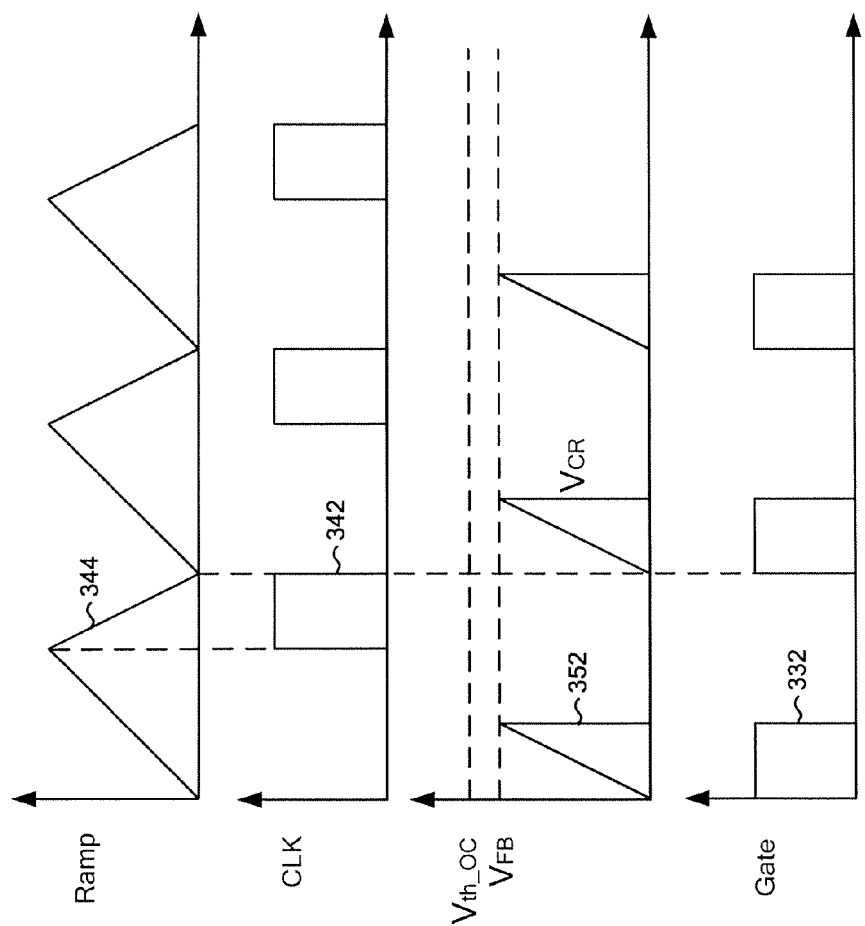
FIG. 3 shows simplified conventional timing diagrams and waveforms for the switch-mode power converter where the power switch is turned off in response to the PWM comparator output signal.
Figure 4:
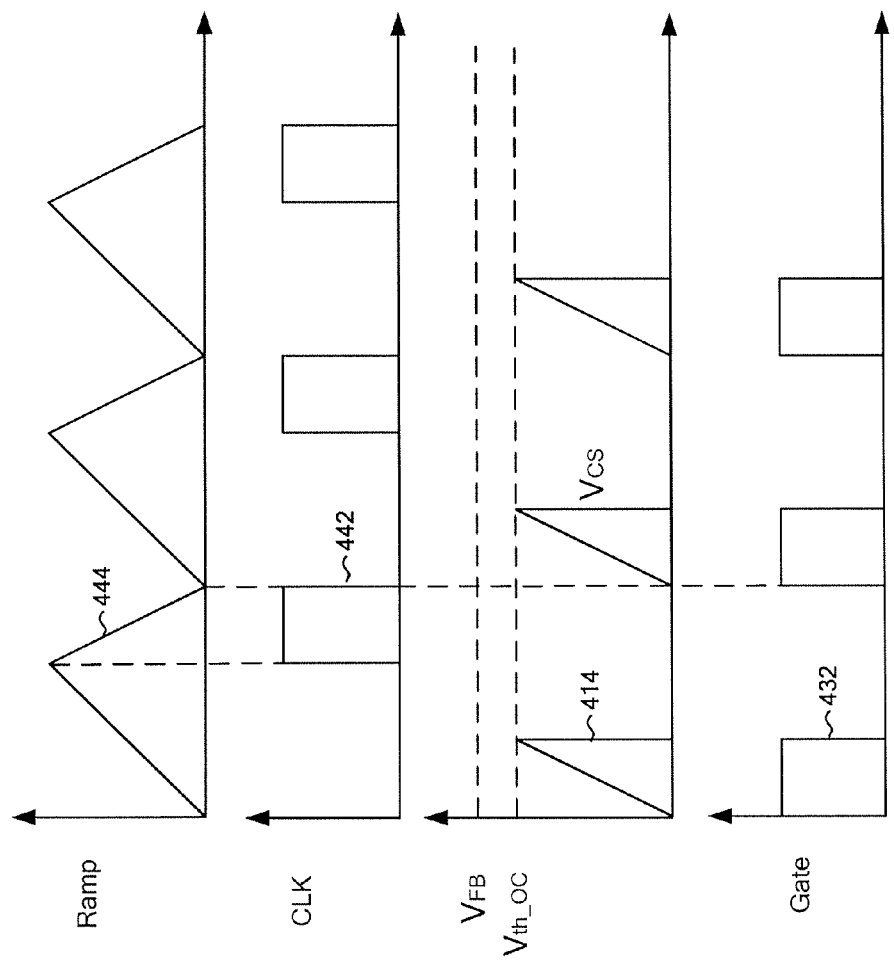
FIG. 4 shows simplified conventional timing diagrams and waveforms for the switch-mode power converter where the power switch is turned off in response to the current sensing signal.
Figure 5:
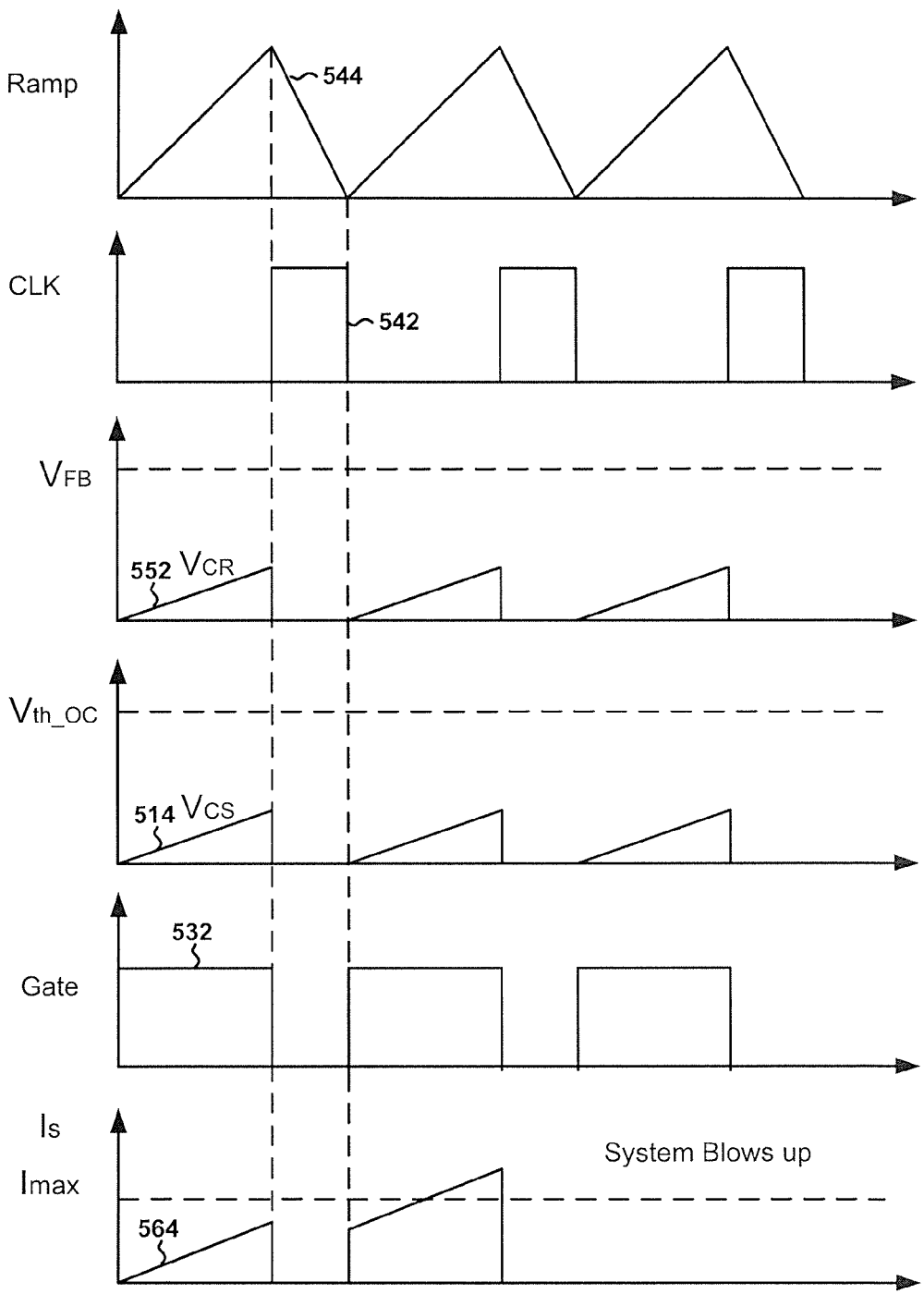
FIG. 5 shows simplified timing diagrams and waveforms for the switch-mode power converter where the current sensing fails and the current exceeds the predetermined maximum magnitude.

FIG. 5 shows simplified timing diagrams and waveforms for the switch-mode power converter 100 where the current sensing fails and the current 164 exceeds the predetermined maximum magnitude. Curves 544, 542, 552, 514, 532, and 564 represent the signals 244, 242, 252, 114, 132, and 164 as functions of time respectively. When the current sensing fails, the current sensing signal 114 cannot accurately represent the magnitude of the current 164, thus allowing excessively large magnitude of the current 164. Consequently, the current 164 exceeds the predetermined maximum magnitude, and cause damage to the switch-mode power converter 100.

Figure 6A:
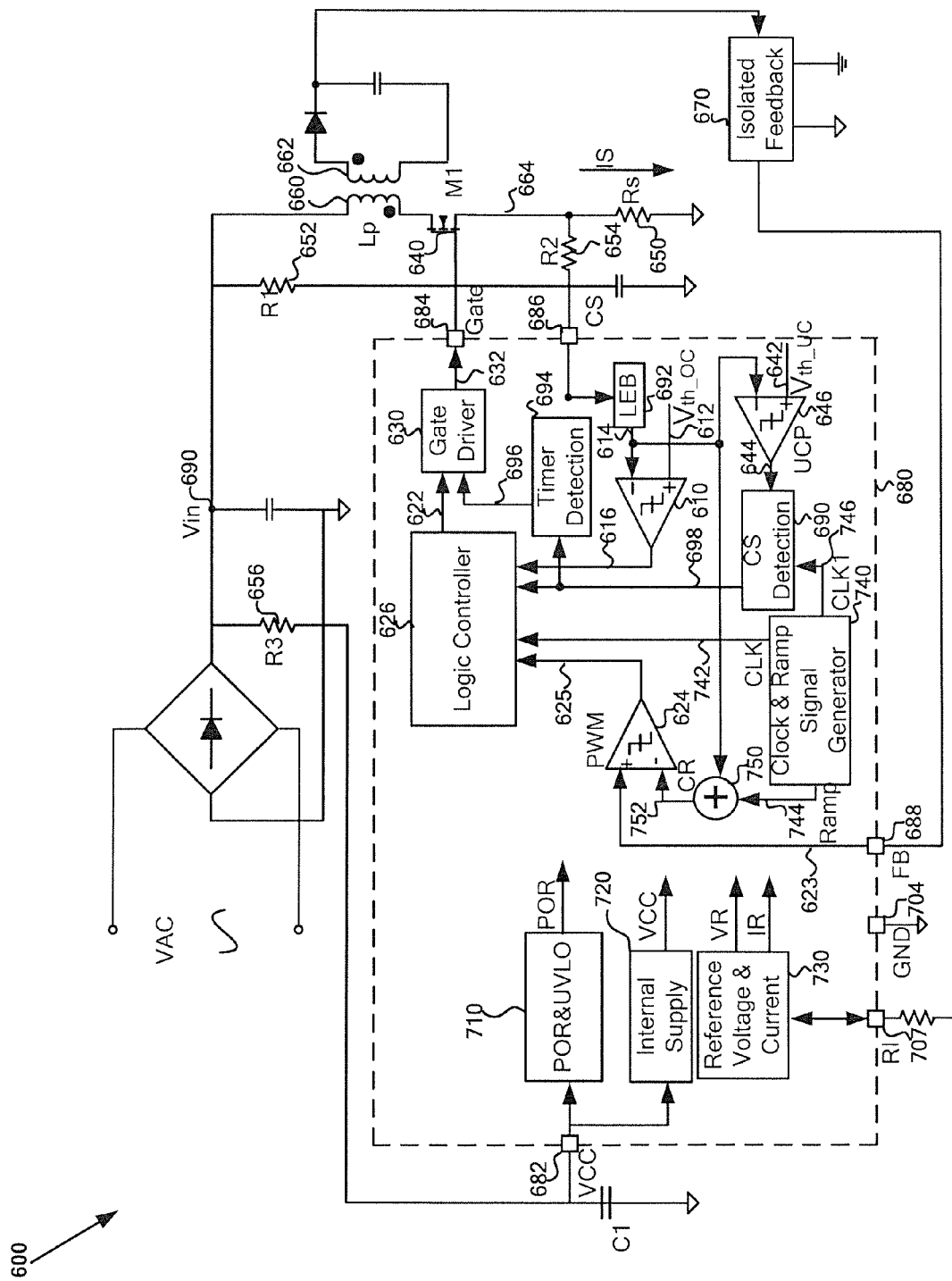
FIG. 6(A) is a simplified diagram showing a switch-mode power converter with protection according to an embodiment of the present invention.

FIG. 6(A) is a simplified diagram showing a switch-mode power converter with protection according to an embodiment of the present invention. This diagram is merely an example, which should not unduly limit the scope of the claims. One of ordinary skill in the art would recognize many variations, alternatives, and modifications. A switch-mode power converter 600 includes an OCP comparator 610, a PWM comparator 624, a logic controller 626, a gate driver 630, a power switch 640, resistors 650, 652, 654, and 656, a primary winding 660, a secondary winding 662, an isolated feedback component 670, a leading-edge-blanking component 692, a power-on-reset and under-voltage-lockout component 710, an internal power supply 720, a reference voltage and current generator 730, a clock and ramp signal generator 740, a summation component 750, a comparator 646, a detection component 690, and a timer detection component 694.

For example, the OCP comparator 610, the PWM comparator 624, the logic controller 626, the gate driver 630, the leading-edge-blanking component 692, the power-on-reset and under-voltage-lockout component 710, the internal power supply 720, the reference voltage and current generator 730, the clock and ramp signal generator 740, the summation component 750, the comparator 646, the detection component 690, and the timer detection component 694 are parts of a chip 680 for PWM control, which also includes terminals 682, 684, 686, 688, 702 and 704. In another example, the PWM comparator 624 and the logic controller 626 are parts of a PWM controller component.

According to one embodiment, the OCP comparator 610, the PWM comparator 624, the power switch 640, the resistors 650, 652, 654, and 656, the primary winding 660, the secondary winding 662, the isolated feedback component 670, the leading-edge-blanking component 692, the power-on-reset and under-voltage-lockout component 710, the internal power supply 720, the reference voltage and current generator 730, and the summation component 750 are substantially the same as the OCP comparator 110, the PWM comparator 124, the power switch 140, the resistors 150, 152, 154, and 156, the primary winding 160, the secondary winding 162, the isolated feedback component 170, the leading-edge-blanking component 192, the power-on-reset and under-voltage-lockout component 210, the internal power supply 220, the reference voltage and current generator 230, and the summation component 250 respectively.

According to another embodiment, an output voltage of the secondary winding 662 is sensed by the isolated feedback component 670. For example, the isolated feedback component 670 includes an error amplifier and an opto-coupler. In another example, the isolated feedback component 670 sends a feedback signal 623 to the PWM comparator 624 through the terminal 688.

In one embodiment, a current sensing signal 614 is received and added to a ramp signal 744 by the summation component 750. For example, the ramp signal 744 is generated by the clock and ramp signal generator 740, which also outputs a clock signal 742. In another example, the summation component 750 generates a summation signal 752, which is also received by the PWM comparator 624. In another embodiment, the PWM comparator 624 compares the summation signal 752 with the feedback signal 623 and outputs the PWM comparator output signal 625.

As shown in FIG. 6(A), the PWM comparator output signal 625 is received by the logic controller 626, which generates a PWM signal 622 based on at least information associated with the PWM comparator output signal 625. For example, the PWM signal 622 is received by the gate driver 630, and based on at least information associated with the PWM signal 622, the gate driver 630 sends a gate signal 632 to the power switch 640 through the terminal 684. In another example, the power switch 640 adjusts the current 664 flowing through the primary winding 660.

In one embodiment, the current 664 is sensed by the resistor 650 and converted into the current sensing signal 614 (e.g., $V_{cs}$) through the terminal 686 and the leading-edge-blanking component 692. For example, the current sensing signal 614 is received by the OCP comparator 610 and compared with an over-current threshold signal 612 (e.g., $V_{th\_oc}$. In another example, in response, the OCP comparator 610 sends an over-current control signal 616 to the logic controller 626, which also receives the PWM comparator output signal 625 and the clock signal 742.

As shown in FIG. 6(A), the current sensing signal 614 is also received by the comparator 646 and compared with a threshold signal 642 (e.g., $V_{th\_uc}$) according to one embodiment. For example, $V_{th\_uc}$ is much smaller than $V_{th\_oc}$. In another example, in response, the comparator 646 sends a comparison signal 644 to the detection component 690. In yet another example, the detection component 690 receives a clock signal 746 from the clock and ramp signal generator 740. In one embodiment, the clock signal 746 is in sync with the clock signal 742. For example, rising edges of the clock 746 match with falling edges of the clock signal 742 in time. In another embodiment, the detection component 690 detects the value of the comparison signal 644 at each falling edge of the clock signal 746 and/or detects the value of the comparison signal 644 when the clock signal 746 is at the logic low level. For example, in response, the detection component 690 generates a control signal 698 to indicate whether the comparison signal 644 is at the logic high level at the falling edge or when the clock signal 746 is at the logic low level.

According to one embodiment, the logic controller 626 receives the control signal 698, the over-current control signal 616, the PWM comparator output signal 625, and the clock signal 742. For example, the logic controller 626, in response, generates the PWM signal 622 based on at least information associated with the signals 698, 616. 625. and 742. According to another embodiment, the PWM signal 622 is received by the gate driver 630, which outputs the gate signal 632 to the power switch 640 through the terminal 684.

For example, if the PWM comparator output signal 625 is at the logic low level and the summation signal 752 is larger than the feedback signal 623 in magnitude, the power switch 640 is turned off. In another example, if the over-current control signal 616 is at the logic low level and the current sensing signal 614 is larger than the over-current threshold signal 612 (e.g., Vth_oc) in magnitude, the power switch 640 is turned off and the switch-mode power converter 600 is shut down to limit the magnitude of the current 664 and protect the switch-mode power converter 600. In yet another example, if the control signal 698 indicates that the comparison signal 644 is at the logic high level at the falling edge, the power switch 640 is turned off.

In one embodiment, the control signal 698 is also received by the timer detection component 694, which generates a control signal 696 that indicates whether the control signal 698 keeps indicating the comparison signal 644 is at the logic high level at the falling edges for a predetermined period of time. For example, the control signal 696 is received by the gate driver 630. In another example, if the control signal 644 keeps indicating the comparison signal 644 is at the logic high level at the falling edges for the predetermined period of time, the gate signal 632 causes the switch-mode power converter 600 to shut down in order to limit the current 664 and protect the switch-mode power converter 600.

As discussed above and further emphasized here, FIG. 6(A) is merely an example, which should not unduly limit the scope of the claims. One of ordinary skill in the art would recognize many variations, alternatives, and modifications. For example, the control signal 698 is not received by the logic controller 626, and the timer detection component 694 is replaced by a delay component, which, upon receipt of the control signal 698, causes the switch-mode power converter 600 to shut down, as shown in FIG. 6(B).

Figure 6B:
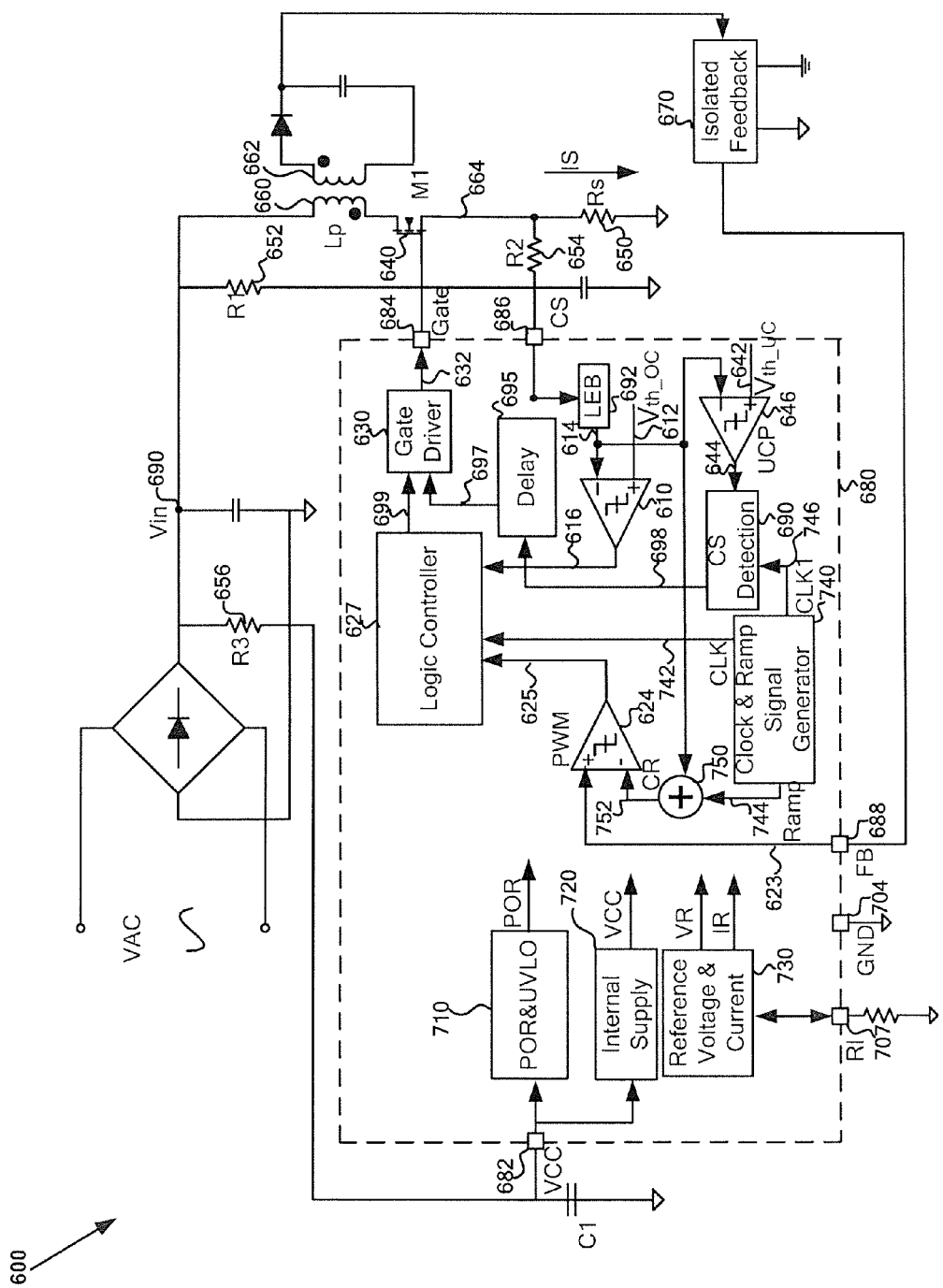
FIG. 6(B) is a simplified diagram showing a switch-mode power converter with protection according to another embodiment of the present invention.

FIG. 6(B) is a simplified diagram showing a switch-mode power converter with protection according to another embodiment of the present invention. This diagram is merely an example, which should not unduly limit the scope of the claims. One of ordinary skill in the art would recognize many variations, alternatives, and modifications. A switch-mode power converter 600 includes an OCP comparator 610, a PWM comparator 624, a logic controller 627, a gate driver 630, a power switch 640, resistors 650, 652, 654, and 656, a primary winding 660, a secondary winding 662, an isolated feedback component 670, a leading-edge-blanking component 692, a power-on-reset and under-voltage-lockout component 710, an internal power supply 720, a reference voltage and current generator 730, a clock and ramp signal generator 740, a summation component 750, a comparator 646, a detection component 690, and a delay component 695.

For example, the OCP comparator 610, the PWM comparator 624, the logic controller 627, the gate driver 630, the leading-edge-blanking component 692, the power-on-reset and under-voltage-lockout component 710, the internal power supply 720, the reference voltage and current generator 730, the clock and ramp signal generator 740, the summation component 750, the comparator 646, the detection component 690, and the delay component 695 are parts of a chip 680 for PWM control, which also includes terminals 682, 684, 686, 688, 702 and 704. In another example, the PWM comparator 624 and the logic controller 627 are parts of a PWM controller component.

According to one embodiment, the OCP comparator 610, the PWM comparator 624, the logic controller 627, the power switch 640, the resistors 650, 652, 654, and 656, the primary winding 660, the secondary winding 662, the isolated feedback component 670, the leading-edge-blanking component 692, the power-on-reset and under-voltage-lockout component 710, the internal power supply 720, the reference voltage and current generator 730, and the summation component 750 are substantially the same as the OCP comparator 110, the PWM comparator 124, the logic controller 126, the power switch 140, the resistors 150, 152, 154, and 156, the primary winding 160, the secondary winding 162, the isolated feedback component 170, the leading-edge-blanking component 192, the power-on-reset and under-voltage-lockout component 210, the internal power supply 220, the reference voltage and current generator 230, and the summation component 250 respectively.

According to another embodiment, the PWM comparator output signal 625 is received by the logic controller 627, which also receives the over-current control signal 616 and the clock signal 742. For example, the logic controller 627, in response, generates the PWM signal 699 based on at least information associated with the signals 616. 625, and 742. In another example, the PWM signal 699 is received by the gate driver 630.

As shown in FIG. 6(B), the control signal 698 is received by the delay component 695, which, after a predetermined delay, generates a control signal 697. For example, the control signal 697 is the same as the corresponding control signal 698 before the predetermined delay. In another example, the control signal 697 is received by the gate driver 630.

In one embodiment, the gate driver 630 receives the control signal 697 and the PWM signal 699, and in response, outputs the gate signal 632 to the power switch 640 through the terminal 684. For example, the power switch 640 adjusts the current 664 flowing through the primary winding 660. In another example, if the control signal 697 indicates the comparison signal 644 is at the logic high level at the falling edge of the clock signal 746, the gate signal 632 causes the switch-mode power converter 600 to shut down in order to limit the current 664 and protect the switch-mode power converter 600.

Figure 7A:
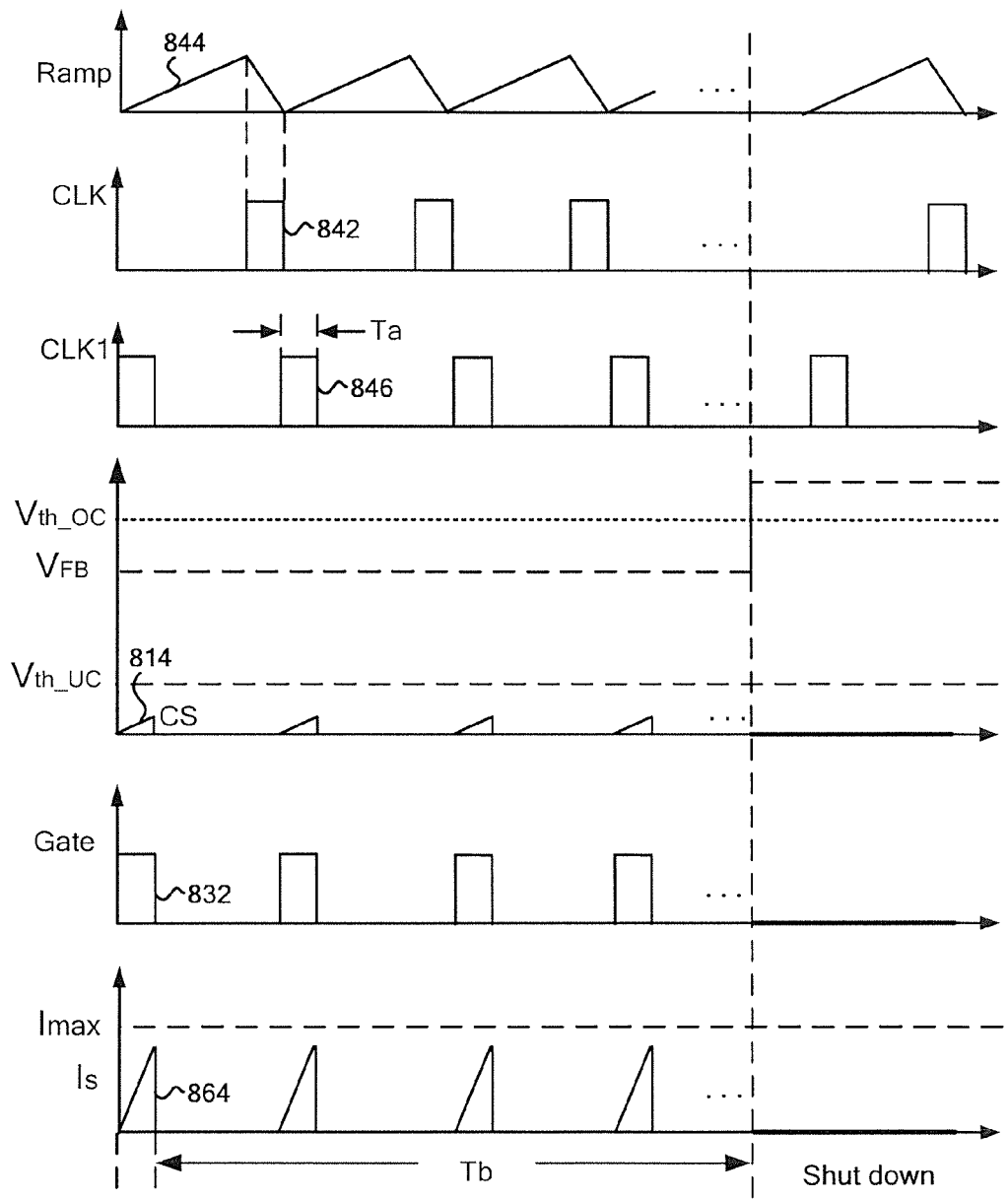
FIG. 7(A) shows simplified timing diagrams and waveforms for the switch-mode power converter as shown in FIG. 6(A) according to an embodiment of the present invention.

FIG. 7(A) shows simplified timing diagrams and waveforms for the switch-mode power converter 600 as shown in FIG. 6(A) according to an embodiment of the present invention. These diagrams and waveforms are merely examples, which should not unduly limit the scope of the claims. One of ordinary skill in the art would recognize many variations, alternatives, and modifications.

As shown in FIG. 7(A), curves 844, 842, 846, 814, 832, and 864 represent the signals 744, 742, 746, 614, 632, and 664 as functions of time respectively. According to one embodiment, if the current sensing fails, the current sensing signal 614 (corresponding to the curve 814) remains nearly zero or very small in magnitude. For example, the current sensing signal 614 (corresponding to the curve 814) is received by the comparator 646 and compared with the threshold signal 642 (e.g., $V_{th\_uc}$), which is smaller than the over-current threshold signal 612 (e.g., Vth_oc) in magnitude. In another example, at falling edges of the clock signal 746 and when the clock signal 746 is at the logic low level (corresponding to the curve 846), the comparison signal 644 from the comparator 646 is detected by the detection component 690. In one embodiment, if, at a falling edge of the clock signal 746, the comparison signal 644 is at the logic high level, the power switch 640 is turned off and the on-time of the power switch 640 is limited to the pulse width (e.g., $T_a$) of the clock signal 746

(corresponding to the curve 846). For example, the pulse width (e.g., $T_a$) of the clock signal 746 is chosen to correspond to 10%-30% of the duty cycle of the maximum switching frequency. In another example, the duty cycle of the gate signal 632 is limited to the duty cycle of the clock signal 746, and the current 664, under the discontinuous current mode (DCM), is limited:

$$I_{limit} = \frac{V_{in}}{L_p} T_a \qquad \text{(Equation 3)}$$

where $V_{in}$ is the line input voltage at node 690, and $L_p$ is the inductance of the primary winding 660. In another embodiment, if the comparison signal 644 is detected to be at the logic high level for a predetermined period of time (e.g., $T_b$), the switch-mode power converter 600 or the power switch 640 is shut down. For example, the switch-mode power converter 600 is shut down by turning off the power switch 640 until a reset signal is received. In another example, the power switch 640 is shut down by turning off the power switch 640 until a reset signal is received.

Figure 7B:
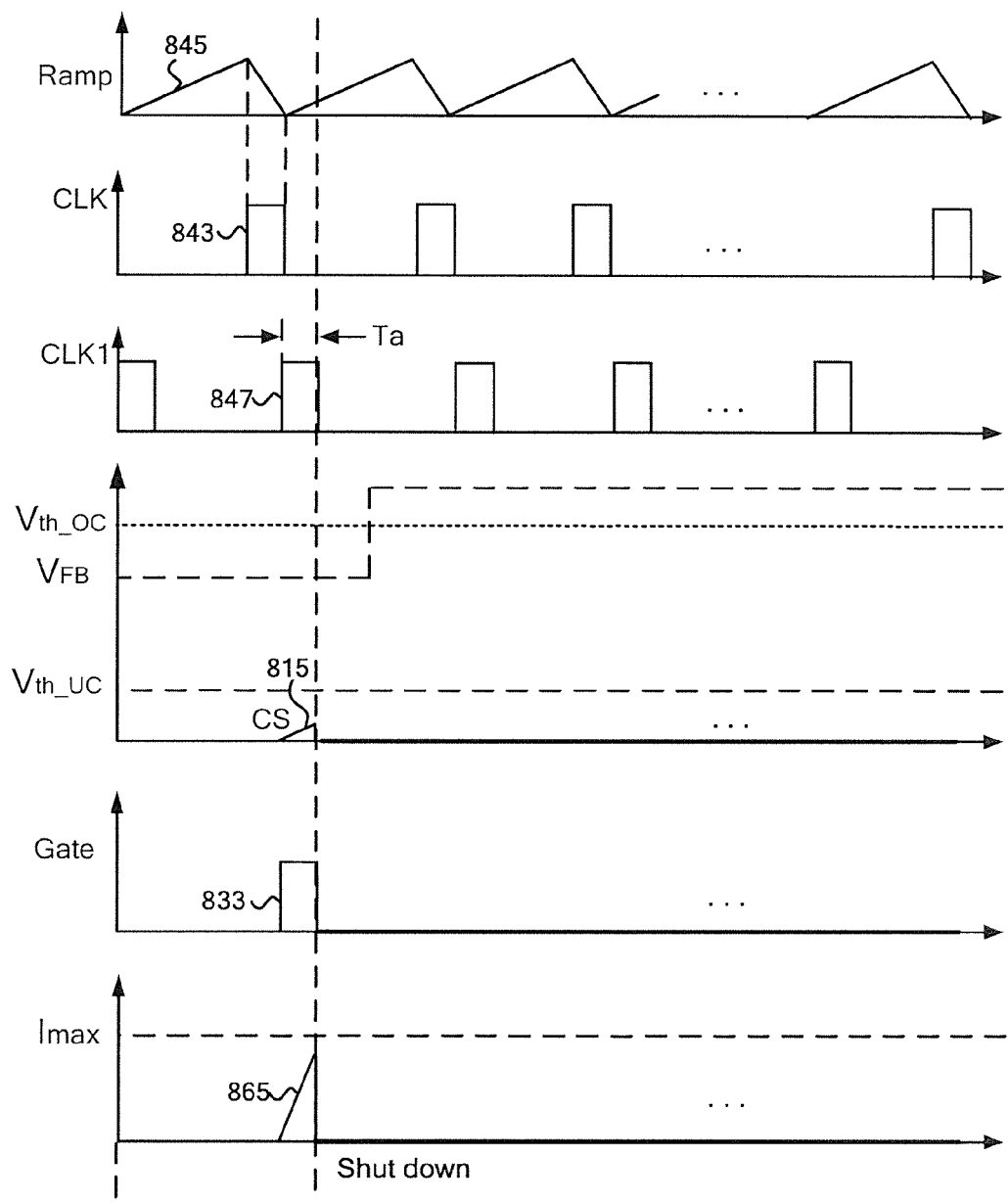
FIG. 7(B) shows simplified timing diagrams and waveforms for the switch-mode power converter 600 as shown in FIG. 6(B) according to an embodiment of the present invention.

FIG. 7(B) shows simplified timing diagrams and waveforms for the switch-mode power converter 600 as shown in FIG. 6(B) according to an embodiment of the present invention. These diagrams and waveforms are merely examples, which should not unduly limit the scope of the claims. One of ordinary skill in the art would recognize many variations, alternatives, and modifications.

As shown in FIG. 7(B), curves 845, 843, 847, 815, 833, and 865 represent the signals 744, 742, 746, 614, 632, and 664 as functions of time respectively. For example, the curves 845, 843, 847, 815, 833, and 865 are similar with the curves 844, 842, 846, 814, 832, and 864 respectively, except that in FIG. 7(B), if the comparison signal 644 is once detected to be at the logic high level, the switch-mode power converter 600 or the power switch 640 is shut down as shown by the curve 833 with a predetermined delay that is equal to zero. For example, the switch-mode power converter 600 is shut down by turning off the power switch 640 until a reset signal is received. In another example, the power switch 640 is shut down by turning off the power switch 640 until a reset signal is received.

Figure 8A:
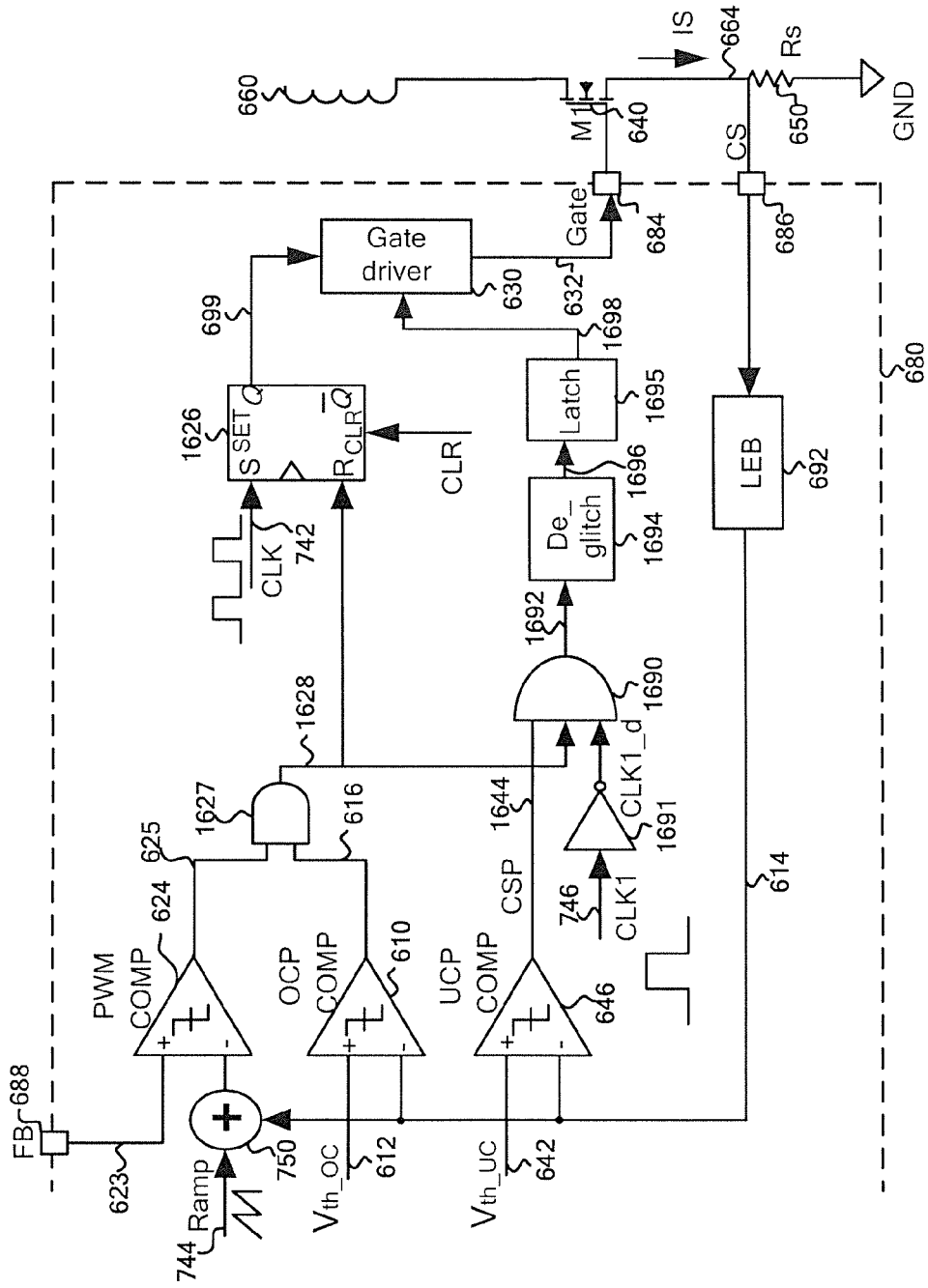
FIG. 8(A) is a simplified diagram showing the chip for PWM control in the switch-mode power converter as shown in FIG. 6(B) according to an embodiment of the present invention.

FIG. 8(A) is a simplified diagram showing the chip 680 for PWM control in the switch-mode power converter 600 as shown in FIG. 6(B) according to an embodiment of the present invention. This diagram is merely an example, which should not unduly limit the scope of the claims. One of ordinary skill in the art would recognize many variations, alternatives, and modifications. The chip 680 for PWM control includes at least the OCP comparator 610, the PWM comparator 624, the gate driver 630, the leading-edge-blanking component 692, the summation component 750, the comparator 646, a flip-flop component 1626, AND gates 1627 and 1690, a NOT gate 1691, a deglitch component 1694, and a latch component 1695. Additionally, the chip 680 also includes at least the terminals 684, 686 and 688.

Referring to FIG. 6(B), the logic controller 627 includes the flip-flop component 1626 and the AND gate 1627 according to one embodiment. According to another embodiment, the detection component 690 includes the AND gate 1690 and the NOT gate 1691. According to yet another embodiment, the delay component 695 includes the deglitch component 1694 and the latch component 1695.

As shown in FIG. 8(A), the comparison signal 644 is detected at each falling edge of the clock signal 746 and when the clock signal 746 is at the logic low level according to one embodiment. For example, under normal operation for current sensing, when the power switch 640 is just turned on, the comparison signal 644 is at the logic high level as the current 664 ramps up. In another example, if the current sensing signal 614 reaches or exceeds the threshold signal 642 (e.g., $V_{th\_uc}$) before the falling edge of the clock signal 746, the comparison signal 644 changes to the logic low level before the falling edge of the clock signal 746. Consequently, according to one embodiment, an output signal 1692 of the AND gate 1690 is also at the logic low level, as follows:

$$V_{th\_UC} < \frac{V_{in}}{L_p} \times R_s \times T_a \qquad \text{(Equation 4)}$$

where $V_{in}$ represents an input voltage at a node 690, $L_p$ represents the inductance value of the primary winding 660, $R_s$ represents the resistance value of the resistor 650, and $T_a$ represents the pulse width of the clock signal 746.

Therefore, the current 664, under the discontinuous current mode (DCM), is, for example, limited according to Equation 3. In yet another example, if the current sensing fails, the current sensing signal 614 remains nearly zero or very small in magnitude; therefore, the comparison signal 644 remains at the logic high level after the pulse width of the clock signal 746, and the output signal 1692 is also at the logic high level.

According to one embodiment, the signal 1692 is received by the deglitch component 1694, which, with a predetermined delay, outputs a signal 1696 to the latch component 1695. For example, the signal 1696 is the same as the corresponding signal 1692 before the predetermined delay. In another example, in response, the latch component 1695 outputs a signal 1698 to the gate driver 630. In one embodiment, if the signal 1692 is at the logic low level, the corresponding signal 1698 is at the logic high level. In another embodiment, if the signal 1692 is at the logic high level, the corresponding signal 1698 is at the logic low level. As shown in FIG. 8(A), if the signal 1698 is at the logic low level, the gate signal 632 is also at the logic low level, causing the power switch 640 to be turned off and the switch-mode power converter to be shut down.

Figure 8B:
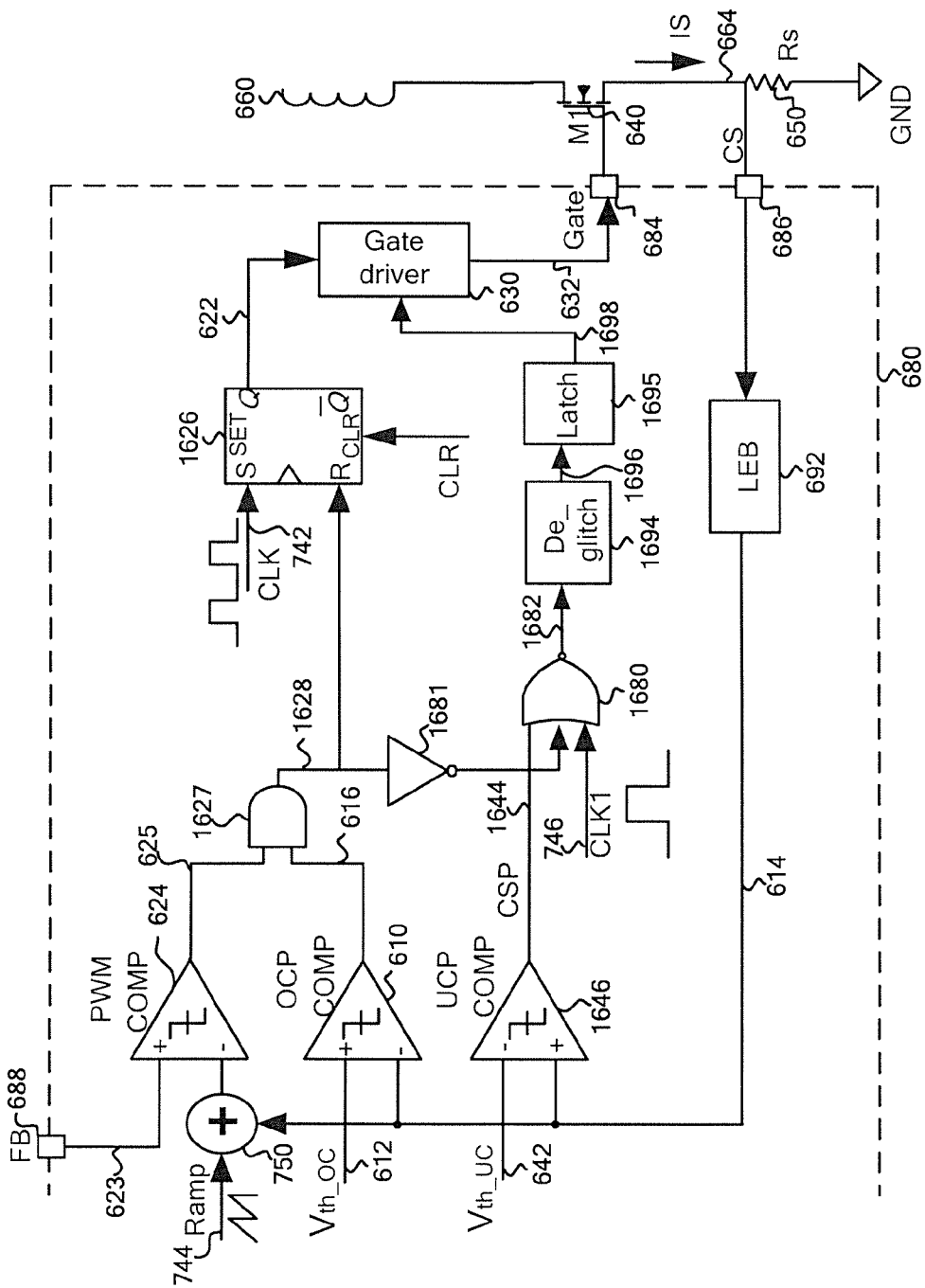
FIG. 8(B) is a simplified diagram showing the chip for PWM control in the switch-mode power converter as shown in FIG. 6(B) according to an embodiment of the present invention.

FIG. 8(B) is a simplified diagram showing the chip 680 for PWM control in the switch-mode power converter 600 as shown in FIG. 6(B) according to an embodiment of the present invention. This diagram is merely an example, which should not unduly limit the scope of the claims. One of ordinary skill in the art would recognize many variations, alternatives, and modifications.

The chip 680 for PWM control includes at least the OCP comparator 610, the PWM comparator 624, the gate driver 630, the leading-edge-blanking component 692, the summation component 750, a comparator 1646, a flip-flop component 1626, an AND gate 1627, a NOR gate 1680, a NOT gate 1681, a deglitch component 1694, and a latch component 1695. Additionally, the chip 680 also includes at least the terminals 684, 686 and 688.

Referring to FIG. 6(B), the logic controller 626 includes the flip-flop component 1626 and the AND gate 1627 according to one embodiment. According to another embodiment, the detection component 690 includes the NOR gate 1680 and the NOT gate 1681. According to yet another embodiment, the delay component 695 includes the deglitch component 1694 and the latch component 1695.

In comparison between FIG. 8(A) and FIG. 8(B), the comparator 646, the NOT gate 1691 and the AND gate 1690 are replaced by the comparator 1646, the NOT gate 1681 and the NOR gate 1680 respectively according to one embodiment. For example, as shown in FIG. 8(B), the comparator 1646 receives the threshold signal 642 (e.g., $V_{th\_uc}$) at the "−" terminal and the current sensing signal 614 at the "+" terminal and in response generates a comparison signal 1644 to the NOR gate 1680.

Figure 9A:
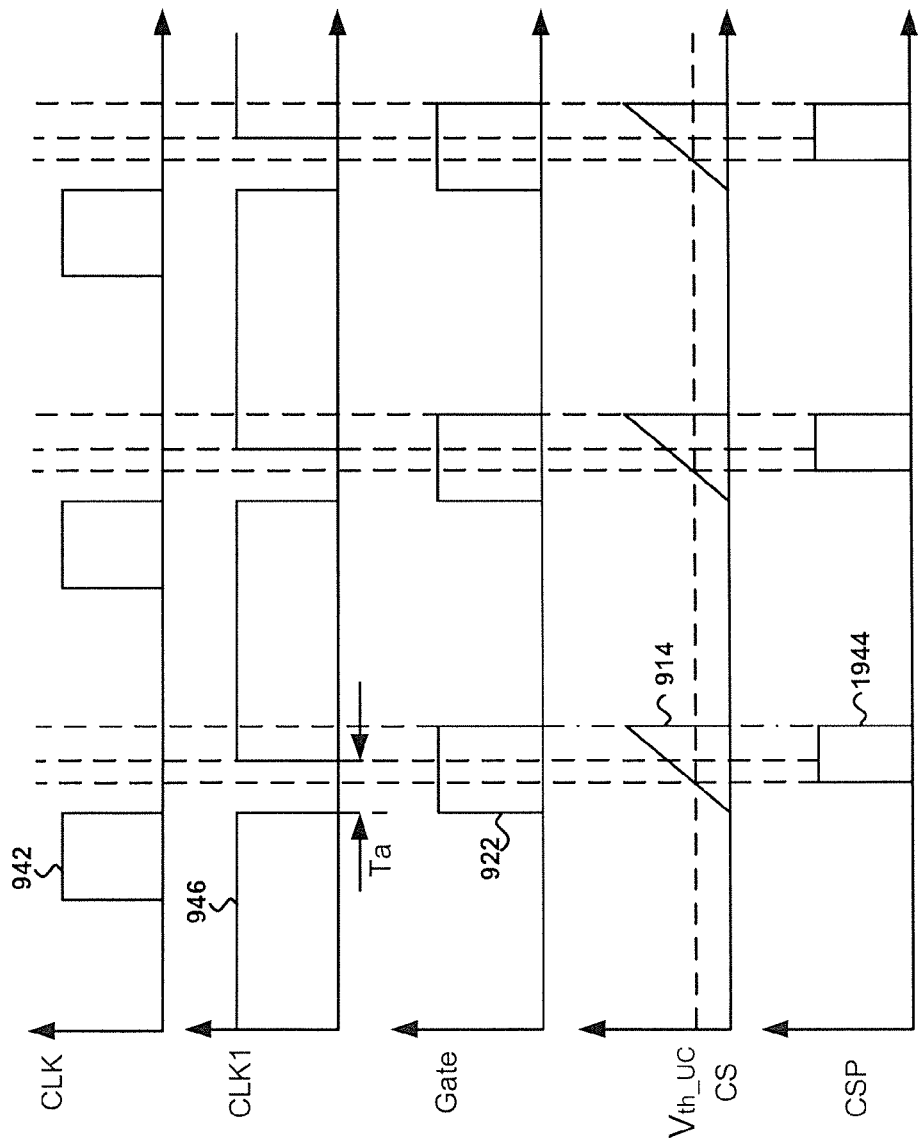
FIG. 9(A) shows simplified timing diagrams and waveforms for the switch-mode power converter as shown in FIGS. 6(B) and 8(B) under normal operation of current sensing where the pulse width of the gate signal exceeds the pulse width of the clock signal according to an embodiment of the present invention.

FIG. 9(A) shows simplified timing diagrams and waveforms for the switch-mode power converter 600 as shown in FIGS. 6(B) and 8(B) under normal operation of current sensing where the pulse width of the gate signal 632 exceeds the pulse width of the clock signal 746 according to an embodiment of the present invention. These diagrams and waveforms are merely examples, which should not unduly limit the scope of the claims. One of ordinary skill in the art would recognize many variations, alternatives, and modifications.

As shown in FIG. 9(A), curves 942, 922, 914, and 1944 represent the signals 742, 632, 614, and 1644 as functions of time respectively, and a curve 946 represents the inverted version of the signal 746 as a function of time, if the current sensing mechanism operates normally and the pulse width of the gate signal 632 (corresponding to the curve 922) exceeds the pulse width of the clock signal 746 (corresponding to the curve 946). For example, the logic high level of the curve 946 corresponds to the logic low level of the signal 746, and the logic low level of the curve 946 corresponds to the logic high level of the signal 746.

In another example, at a rising edge of the clock signal 742 (corresponding to the curve 942), the gate signal 632 (corresponding to the curve 922) changes from the logic low level to the logic high level and causes the power switch 640 to be turned on, but the signal 1644 (corresponding to the curve 1944) remains at the logic low level. In yet another example, with the increase of the current sensing signal 614 (corresponding to the curve 914), the signal 1644 (corresponding to the curve 1944) changes from the logic low level to the logic high level. In yet another example, at the falling edge of the clock signal 746 and when the clock signal 746 is at the logic low level (corresponding to the curve 946), if the gate signal 632 (corresponding to the curve 922) remains at the logic high level, the signal 1644 (corresponding to the curve 1944) is detected to be at the logic high level and the sensing operation is determined to be normal.

Figure 9B:
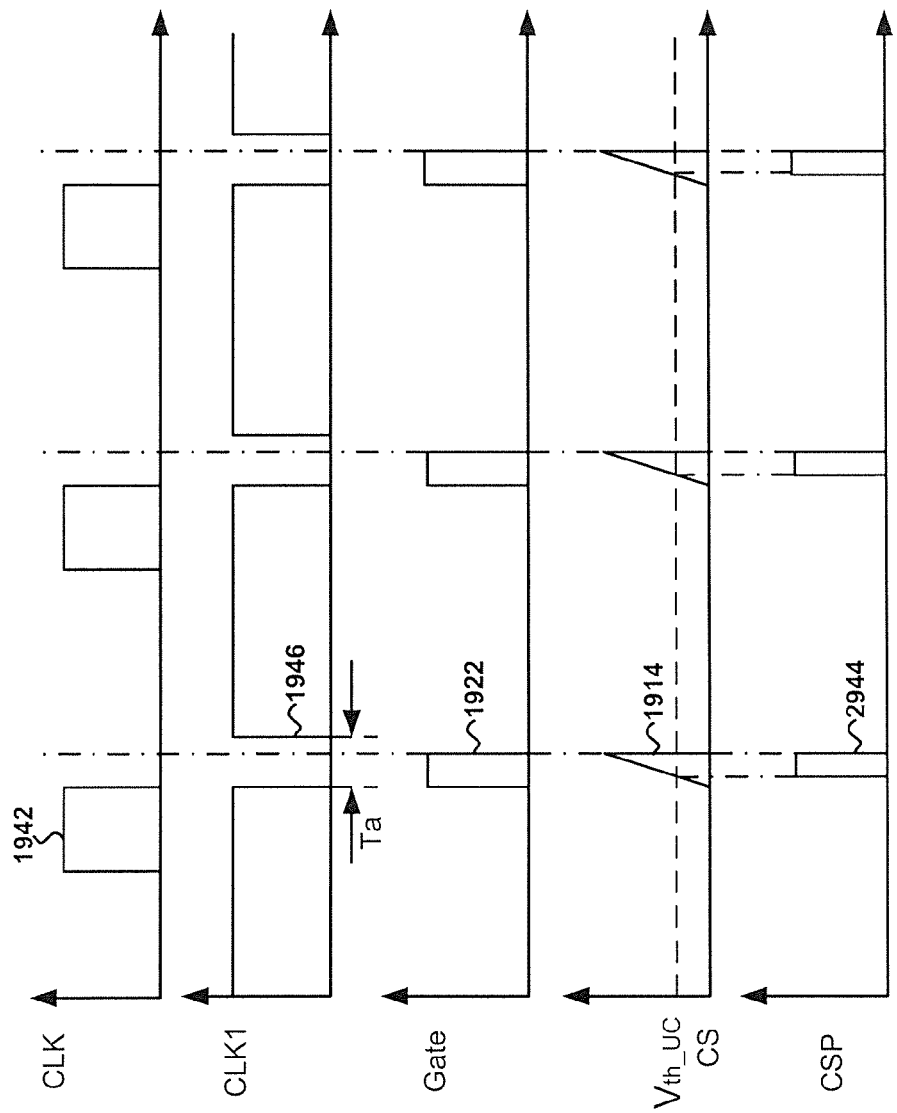
FIG. 9(B) shows simplified timing diagrams and waveforms for the switch-mode power converter as shown in FIGS. 6(B) and 8(B) under normal operation of current sensing where the pulse width of the gate signal is smaller than the pulse width of the clock signal according to an embodiment of the present invention.

FIG. 9(B) shows simplified timing diagrams and waveforms for the switch-mode power converter 600 as shown in FIGS. 6(B) and 8(B) under normal operation of current sensing where the pulse width of the gate signal 632 is smaller than the pulse width of the clock signal 746 according to an embodiment of the present invention. These diagrams and waveforms are merely examples, which should not unduly limit the scope of the claims. One of ordinary skill in the art would recognize many variations, alternatives, and modifications.

As shown in FIG. 9(B), curves 1942, 1922, 1914, and 2944 represent the signals 742, 632, 614, and 1644 as functions of time respectively, and a curve 1946 represents the inverted version of the signal 746 as a function of time, if the current sensing mechanism operates normally and the pulse width of the gate signal 632 (corresponding to the curve 1922) is smaller than the pulse width of the clock signal 746 (corresponding to the curve 1946). For example, the logic high level of the curve 1946 corresponds to the logic low level of the signal 746, and the logic low level of the curve 1946 corresponds to the logic high level of the signal 746.

In another example, at a rising edge of the clock signal 742 (corresponding to the curve 1942), the gate signal 632 (corresponding to the curve 1922) changes from the logic low level to the logic high level and causes the power switch 640 to be turned on, but the signal 1644 (corresponding to the curve 2944) remains at the logic low level. In yet another example, with the increase of the current sensing signal 614 (corresponding to the curve 1914), the signal 1644 (corresponding to the curve 2944) changes from the logic low level to the logic high level. In yet another example, at the falling edge of the clock signal 746 and when the clock signal 746 is at the logic low level (corresponding to the curve 1946), if the gate signal 632 (corresponding to the curve 1922) is at the logic low level, the signal 1644 (corresponding to the curve 2944) is not detected and whether the current sensing mechanism is normal is not assessed.

According to one embodiment, if the pulse width of the gate signal 632 (corresponding to the curve 1922) is smaller than the pulse width of the clock signal 746 (corresponding to the curve 1946), regardless of whether the current sensing mechanism is normal or not, the current 664 should not become so large as to cause significant damage to the switch-mode power converter 600.

Figure 9C:
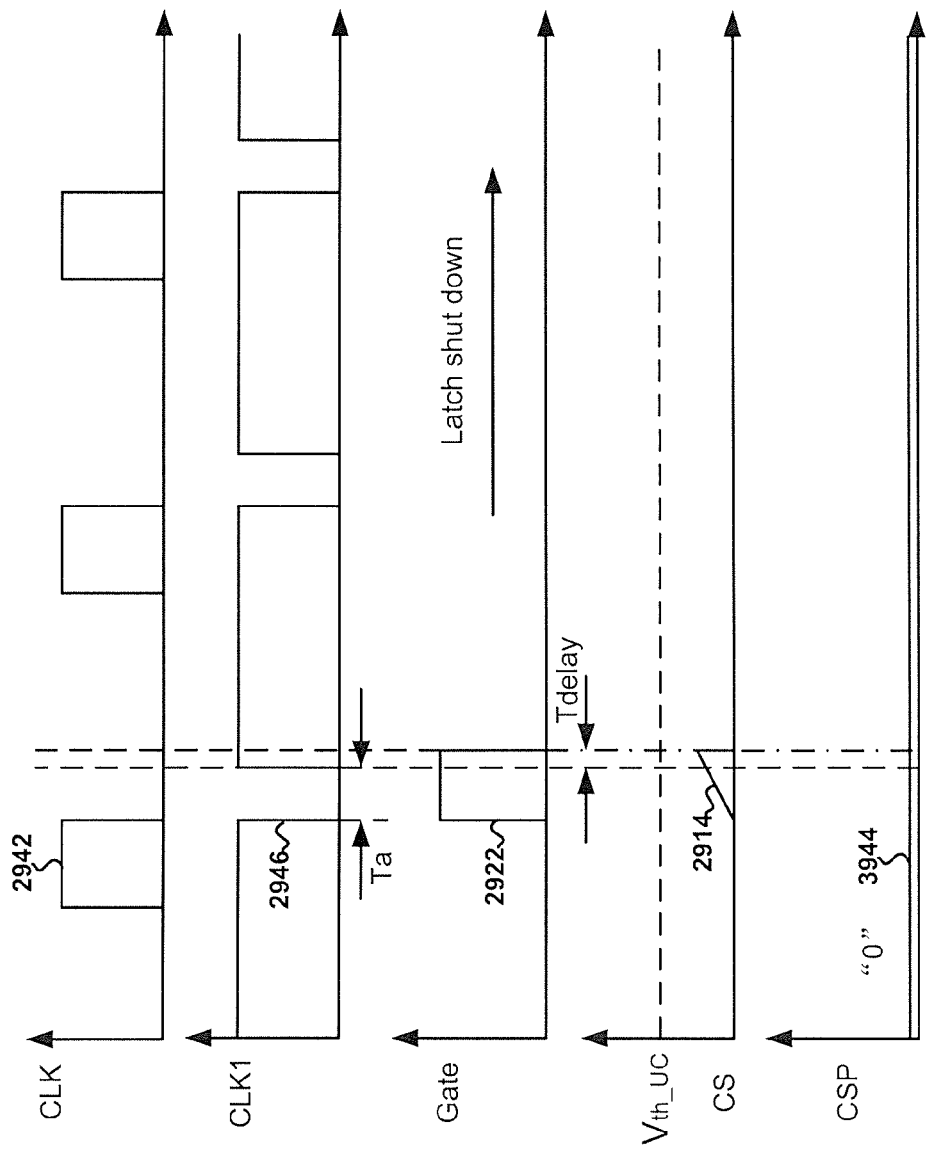
FIG. 9(C) shows simplified timing diagrams and waveforms for the switch-mode power converter as shown in FIGS. 6(B) and 8(B) where the current sensing fails and the pulse width of the gate signal exceeds the pulse width of the clock signal according to yet another embodiment of the present invention.

FIG. 9(C) shows simplified timing diagrams and waveforms for the switch-mode power converter 600 as shown in FIGS. 6(B) and 8(B) where the current sensing fails and the pulse width of the gate signal 632 exceeds the pulse width of the clock signal 746 according to yet another embodiment of the present invention. These diagrams and waveforms are merely examples, which should not unduly limit the scope of the claims. One of ordinary skill in the art would recognize many variations, alternatives, and modifications.

As shown in FIG. 9(C), curves 2942, 2922, 2914, and 3944 represent the signals 742, 632, 614, and 1644 as functions of time respectively, and a curve 2946 represents the inverted version of the signal 746 as a function of time, if the current sensing mechanism fails and the pulse width of the gate signal 632 (corresponding to the curve 2922) exceeds the pulse width of the clock signal 746 (corresponding to the curve 2946). For example, the logic high level of the curve 2946 corresponds to the logic low level of the signal 746, and the logic low level of the curve 2946 corresponds to the logic high level of the signal 746.

In another example, at a rising edge of the clock signal 742 (corresponding to the curve 2942), the gate signal 632 (corresponding to the curve 2922) changes from the logic low level to the logic high level and causes the power switch 640 to be turned on, but the signal 1644 (corresponding to the curve 3944) remains at the logic low level. In yet another example, if the current sensing fails, the current sensing signal 614 (corresponding to the curve 2914) remains nearly zero or very small in magnitude and the signal 1644 (corresponding to the curve 3944) remains at the logic low level. In yet another example, at the falling edge of the clock signal 746 and when the clock signal 746 is at the logic low level (corresponding to the curve 2946), if the gate signal 632 (corresponding to the curve 2922) is at the logic high level, the signal 1644 (corresponding to the curve 3944) is detected to be at the logic low level and the current sensing mechanism is determined to have failed. In response, the gate signal 632 (corresponding to the curve 2922) changes to the logic low level and shut down the switch-mode power converter after a predetermined delay (e.g., $T_{delay}$).

Figure 9D:
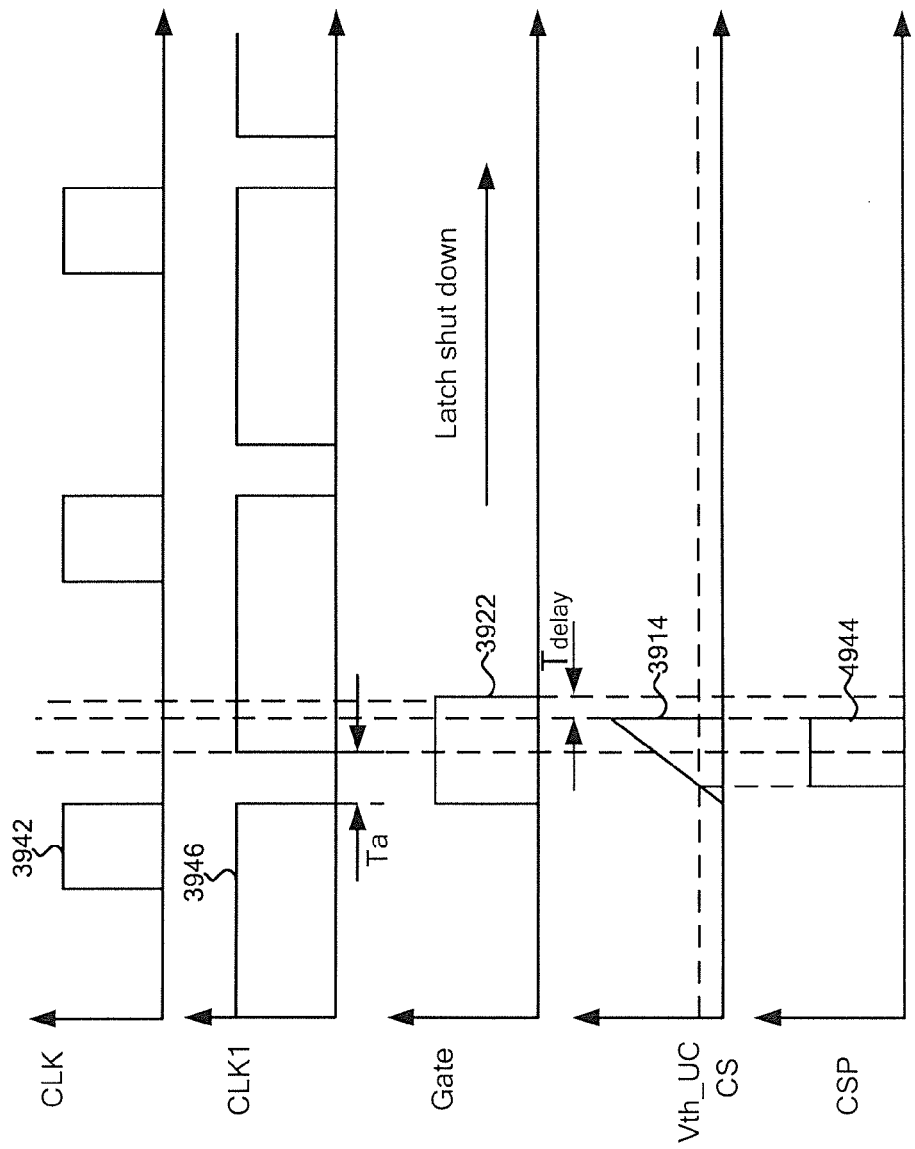
FIG. 9(D) shows simplified timing diagrams and waveforms for the switch-mode power converter as shown in FIGS. 6(B) and 8(B) where the current sensing fails after the falling edge of the clock signal and the pulse width of the gate signal exceeds the pulse width of the clock signal according to yet another embodiment of the present invention.

FIG. 9(D) shows simplified timing diagrams and waveforms for the switch-mode power converter 600 as shown in FIGS. 6(B) and 8(B) where the current sensing fails after the falling edge of the clock signal 746 and the pulse width of the gate signal 632 exceeds the pulse width of the clock signal 746 according to yet another embodiment of the present invention. These diagrams and waveforms are merely examples, which should not unduly limit the scope of the claims. One of ordinary skill in the art would recognize many variations, alternatives, and modifications.

As shown in FIG. 9(D), curves 3942, 3922, 3914, and 4944 represent the signals 742, 632, 614, and 1644 as functions of time respectively, and a curve 3946 represents the inverted version of the signal 746 as a function of time, if the current sensing mechanism fails after the falling edge of the clock signal 746 (corresponding to the curve 3946) and the pulse width of the gate signal 632 (corresponding to the curve 3922) exceeds the pulse width of the clock signal 746 (corresponding to the curve 3946). For example, the logic high level of the curve 3946 corresponds to the logic low level of the signal 746, and the logic low level of the curve 3946 corresponds to the logic high level of the signal 746.

In another example, at a rising edge of the clock signal 742 (corresponding to the curve 3942), the gate signal 632 (corresponding to the curve 3922) changes from the logic low level to the logic high level and causes the power switch 640 to be turned on, but the signal 1644 (corresponding to the curve 4944) remains at the logic low level. In yet another example, if the current sensing fails after the falling edge of the clock signal 746 (corresponding to the curve 3946), the current sensing signal 614 (corresponding to the curve 3914) becomes nearly zero or very small in magnitude when the clock signal 746 is at the logic low level (corresponding to the curve 3946). At that time, if the gate signal 632 (corresponding to the curve 3922) is at the logic high level, the signal 1644 (corresponding to the curve 4944) is detected to be at the logic low level and the current sensing mechanism is determined to have failed according to one embodiment. In response, for example, the gate signal 632 (corresponding to the curve 3922) changes to the logic low level and shut down the switch-mode power converter after a predetermined delay (e.g., $T_{delay}$).

As discussed above and further emphasized here, FIGS. 8(A) and (B) are merely examples, which should not unduly limit the scope of the claims. One of ordinary skill in the art would recognize many variations, alternatives, and modifications. For example, the threshold signal 642 (e.g., $V_{th\_uc}$) changes with time and is in sync with the ramp signal 744. In another example, the ramping slope of the threshold signal 642 (e.g., $V_{th\_uc}$) is predetermined so that the normal operation at low AC input (e.g., VAC) is not be affected.

Figure 10:
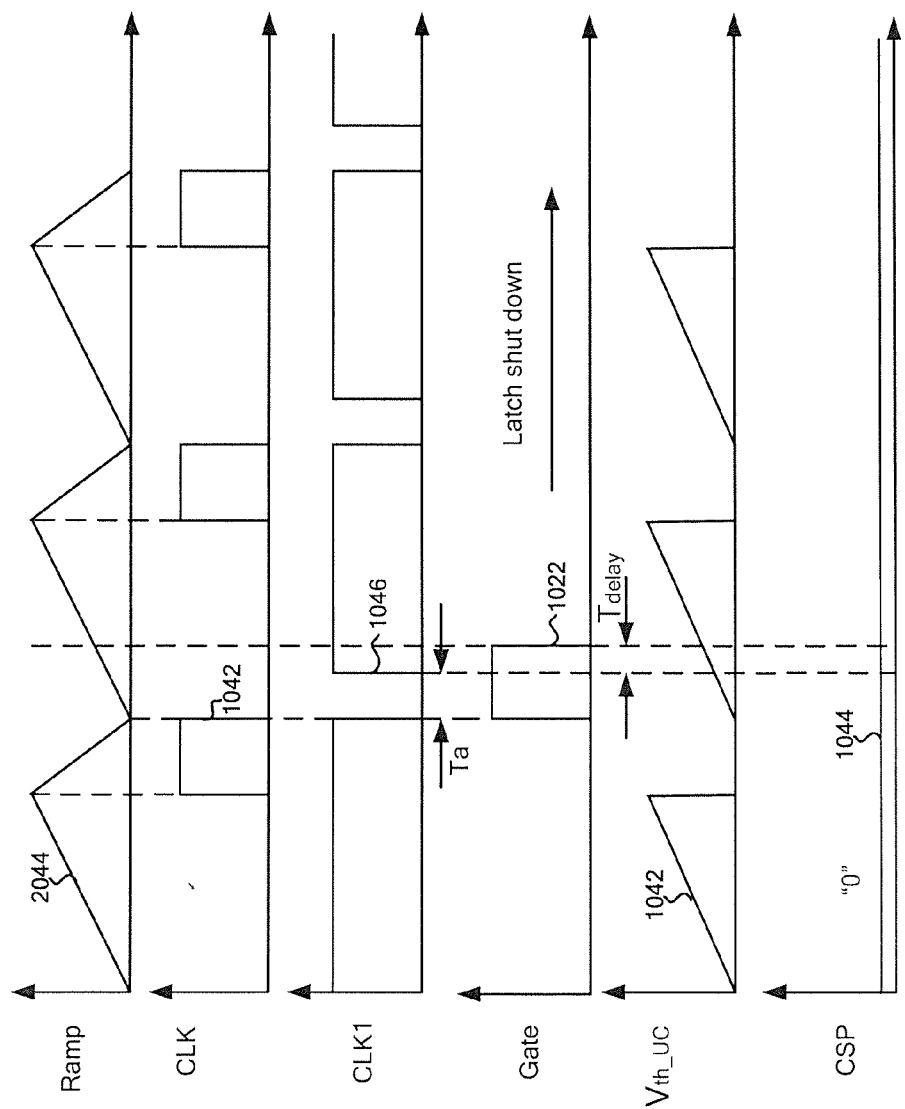
FIG. 10 shows simplified timing diagrams and waveforms for the switch-mode power converter as shown in FIGS. 6(B) and 8(B) where the current sensing fails and the pulse width of the gate signal exceeds the pulse width of the clock signal according to yet another embodiment of the present invention.

FIG. 10 shows simplified timing diagrams and waveforms for the switch-mode power converter 600 as shown in FIGS. 6(B) and 8(B) where the current sensing fails and the pulse width of the gate signal 632 exceeds the pulse width of the clock signal 746 according to yet another embodiment of the present invention. These diagrams and waveforms are merely examples, which should not unduly limit the scope of the claims. One of ordinary skill in the art would recognize many variations, alternatives, and modifications.

As shown in FIG. 10, curves 2044, 1042, 1022, 1042, and 1044 represent the signals 744, 742, 632, 642, and 1644 as functions of time respectively, and a curve 1046 represents the inverted version of the signal 746 as a function of time, if the current sensing mechanism fails and the pulse width of the gate signal 632 (corresponding to the curve 1022) exceeds the pulse width of the clock signal 746 (corresponding to the curve 1046). For example, the logic high level of the curve 1046 corresponds to the logic low level of the signal 746, and the logic low level of the curve 1046 corresponds to the logic high level of the signal 746.

In another example, the threshold signal 642 (e.g., $V_{th\_uc}$) (corresponding to the curve 1042) changes with time and is in sync with the ramp signal 744 (corresponding to the curve 2044). In yet another example, at a rising edge of the signal 742 (corresponding to the curve 1042), the gate signal 632 (corresponding to the curve 1022) changes from the logic high level to the logic low level and causes the power switch 640 to be turned on, but the signal 1644 (corresponding to the curve 1044) remains at the logic low level. In another example, if the current sensing fails, the current sensing signal 614 remains nearly zero or very small in magnitude and the signal 1644 (corresponding to the curve 1044) remains at the logic low level. In yet another example, at the falling edge of the clock signal 746 and when the clock signal 746 is at the logic low level (corresponding to the curve 1046), if the gate signal 632 (corresponding to the curve 1022) is at the logic high level, the signal 1644 (corresponding to the curve 1044) is detected to be at the logic low level and the current sensing mechanism is determined to have failed. In response, the gate signal 632 (corresponding to the curve 1022) changes to the logic low level and shut down the switch-mode power converter after a predetermined delay (e.g., $T_{delay}$).

According to another embodiment, if the current sensing mechanism operates normally and the pulse width of the gate signal 632 exceeds the pulse width of the clock signal 746, the current sensing signal 614 is greater than the threshold signal 642 (e.g., $V_{th\_uc}$) which changes with time and is in sync with the ramp signal 744. For example, as shown in FIG. 8(B), the comparison signal 1644 remains at the logic high level, and the current sensing mechanism is determined to be normal.

As discussed above and further emphasized here, FIG. 6(B) is merely an example, which should not unduly limit the scope of the claims. One of ordinary skill in the art would recognize many variations, alternatives, and modifications. For example, a subcomponent of the detection component 690 outputs a signal to a subcomponent of the delay component 695. In response, the subcomponent of the delay component 695 sends another signal to another subcomponent of the detection component 690, which outputs yet another signal to another subcomponent of the delay component 695, as shown in FIG. 11.

Figure 11:
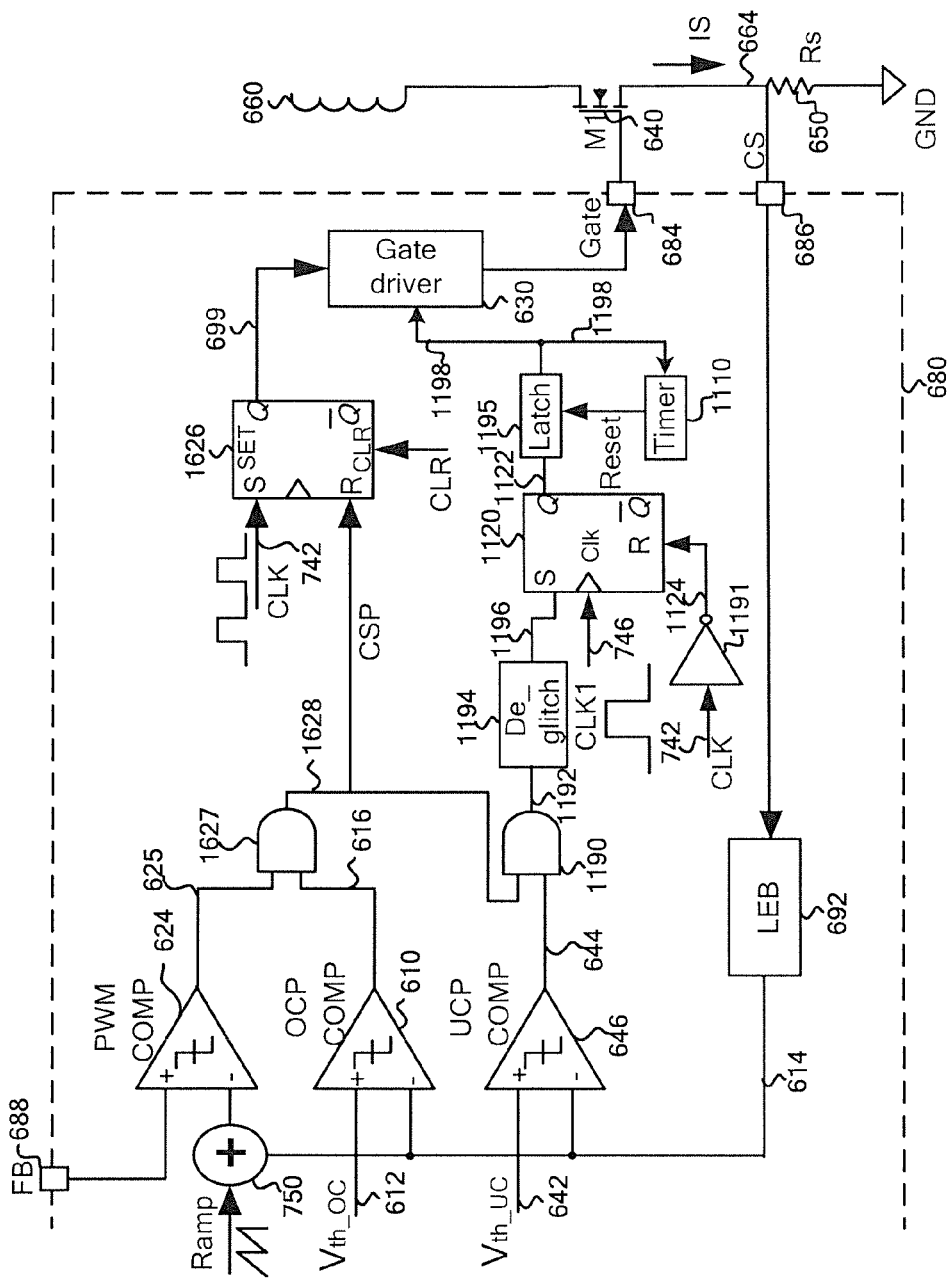
FIG. 11 is a simplified diagram showing the chip for PWM control in the switch-mode power converter as shown in FIG. 6(B) according to an embodiment of the present invention.

FIG. 11 is a simplified diagram showing the chip 680 for PWM control in the switch-mode power converter 600 as shown in FIG. 6(B) according to an embodiment of the present invention. This diagram is merely an example, which should not unduly limit the scope of the claims. One of ordinary skill in the art would recognize many variations, alternatives, and modifications. The chip 680 for PWM control includes at least the OCP comparator 610, the PWM comparator 624, the gate driver 630, the leading-edge-blanking component 692, the summation component 750, the comparator 646, the flip-flop component 1626, the AND gate 1627, an AND gate 1190, a NOT gate 1191, a flip-flop component 1120, a deglitch component 1194, a latch component 1195, and a timer component 1110. Additionally, the chip 680 also includes at least the terminals 684, 686 and 688.

Referring to FIG. 6(B), the logic controller 627 includes the flip-flop component 1626 and the AND gate 1627 according to one embodiment. According to another embodiment, the detection component 690 includes the AND gate 1190, the NOT gate 1191, and the flip-flop component 1120. According to yet another embodiment, the delay component 695 includes the deglitch component 1194, the latch component 1195 and a timer component 1110.

As shown in FIG. 11, when the power switch 640 is just turned on, the comparison signal 644 is at the logic high level as the current 664 ramps up. For example, under normal operation for current sensing, the comparison signal 644 changes to the logic low level before the falling edge of the clock signal 746 if the current sensing signal 614 reaches or exceeds the threshold signal 642 (e.g., $V_{th\_uc}$) also before the falling edge of the clock signal 746. In another example, if the current sensing fails, the current sensing signal 614 remains nearly zero or very small in magnitude even though the current 664 ramps up; therefore, the comparison signal 644 remains at the logic high level even after the pulse width of the clock signal 746.

In one embodiment, the comparison signal 644 is received by the AND gate 1190, which also receives an output signal 1628 from the AND gate 1627 and in response generates a signal 1192. For example, the signal 1192 is received by the deglitch component 1194, which, with a predetermined delay, outputs a signal 1196 to the flip-flop component 1120. In another example, the signal 1196 is the same as the corresponding signal 1192 before the predetermined delay.

In yet another example, the flip-flop component 1120 also receives the clock signal 746 and a signal 1124 from the NOT gate 1191, which also receives the clock signal 742. In yet another example, at each falling edge of the clock signal 746, the flip-flop component 1120 generates an output signal 1122 that is equal to the value of the signal 1196 at the falling edge of the clock signal 746.

In another embodiment, the signal 1122 is received by the latch component 1195. For example, in response, the latch component 1195 outputs a signal 1198 to the gate driver 630. In another example, if the output signal 1122 is at the logic low level, the corresponding signal 1198 is at the logic high level. In yet another example, if the signal 1122 is at the logic high level, the corresponding signal 1198 is at the logic low level. In yet another embodiment, if the signal 1198 is at the logic low level, the gate signal 632 is also at the logic low level, causing the power switch 640 to be turned off.

As shown in FIG. 11, the signal 1198 is also received by the timer component 1110. For example, if the timer component 1110 receives the signal 1198 at the logic low level, the timer component 1110 would reset the signal 1198 to the logic high level after a predetermined period of time, and the signal 1198 at the logic high level would cause the power switch 640 to be ready and/or enabled to turn on again, for example, in next clock cycle. In another example, the power switch 640 is turned off again if the signal 1198 changes to the logic low level in response to the corresponding signal 1122. According to another embodiment, the chip 680 as shown in FIG. 11 detects whether the current sensing mechanism operates normally at falling edges of the clock signal 746, not when the clock signal 746 stays at the logic low level.

As discussed above and further emphasized here, FIG. 11 is merely an example, which should not unduly limit the scope of the claims. One of ordinary skill in the art would recognize many variations, alternatives, and modifications. For example, the timer component 1110 is removed. Without the timer component 1110, if the signal 1198 is at the logic low level, the gate signal 632 is also at the logic low level, causing the power switch 640 to be turned off and the switch-mode power converter to be shut down according to one embodiment.

According to another embodiment, a system for protecting a power converter includes a first comparator configured to receive a first threshold signal and a first signal and to generate a first comparison signal. The first signal is associated with an input current for a power converter. Additionally, the system includes a second comparator configured to receive a second threshold signal and the first signal and to generate a second comparison signal. The second threshold signal is different from the first threshold signal in magnitude. Moreover, the system includes a first detection component configured to receive at least the second comparison signal, detect the second comparison signal only if one or more predetermined conditions are satisfied, and generate a first detection signal based on at least information associated with the detected second comparison signal. Also, the system includes a switch signal generator coupled to at least the first detection component and configured to generate a switch signal for controlling a switch for adjusting the input current for the power converter based on at least information associated with the first comparison signal and the first detection signal. The switch signal generator is further configured to generate the switch signal to turn off the switch if the first comparison signal indicates the first signal is larger than the first threshold signal in magnitude, and the switch signal generator is further configured to generate the switch signal to turn off the switch if the first detection signal indicates the first signal is smaller than the second threshold signal in magnitude. For example, the system is implemented according to FIG. 6(A).

According to another embodiment, a system for protecting a power converter includes a first comparator configured to receive a first threshold signal and a first signal and to generate a first comparison signal. The first signal is associated with an input current for a power converter. Additionally, the system includes a second comparator configured to receive a second threshold signal and the first signal and to generate a second comparison signal. The second threshold signal is different from the first threshold signal in magnitude. Moreover, the system includes a detection and delay component configured to receive at least the second comparison signal, detect, with or without a predetermined delay of time, the second comparison signal only if one or more predetermined conditions are satisfied, process information associated with the detected second comparison signal, and generate a first detection signal based on at least information associated with the corresponding detected second comparison signal before the predetermined delay of time. Also, the system includes a switch signal generator coupled to at least the detection and delay component and configured to generate a switch signal for controlling a switch for adjusting the input current for the power converter based on at least information associated with the first comparison signal and the first detection signal. The switch signal generator is further configured to generate the switch signal to turn off the switch if the first comparison signal indicates the first signal is larger than the first threshold signal in magnitude, and the switch signal generator is further configured to generate the switch signal to turn off the switch if the first detection signal indicates the first signal is smaller than the second threshold signal in magnitude before the predetermined delay of time. For example, the system is implemented according to FIG. 6(B), FIG. 8(A), FIG. 8(B), and/or FIG. 11.

In another example, as shown in FIG. 8(A) and/or FIG. 8(B), the detection and delay component is further configured to receive at least the second comparison signal, detect without the predetermined delay of time the second comparison signal only if the one or more predetermined conditions are satisfied, delay the detected second comparison signal by the predetermined delay of time, and generate a first detection signal based on at least information associated with the corresponding delayed detected second comparison signal before the predetermined delay of time. In yet another example, as shown in FIG. 11, the detection and delay component is configured to receive at least the second comparison signal, detect with the predetermined delay of time the second comparison signal only if the one or more predetermined conditions are satisfied, process information associated with the detected delayed second comparison signal, and generate a first detection signal based on at least information associated with the corresponding detected delayed second comparison signal before the predetermined delay of time.

According to yet another embodiment, a method for protecting a power converter includes receiving a first signal, a first threshold signal, and a second threshold signal. The first signal is associated with an input current for a power converter, and the second threshold signal is different from the first threshold signal in magnitude. Additionally, the method includes generating a first comparison signal based on at least information associated with the first signal and the first threshold signal, and generating a second comparison signal based on at least information associated with the first signal and the second threshold signal. Moreover, the method includes receiving the second comparison signal, detecting the second comparison signal only if one or more predetermined conditions are satisfied, generating a first detection signal based on at least information associated with the detected second comparison signal, processing information associated with the first comparison signal and the first detection signal, and generating a switch signal for controlling a switch for adjusting the input current for the power converter based on at least information associated with the first comparison signal and the first detection signal. The process for generating a switch signal for controlling a switch includes generating the switch signal to turn off the switch if the first comparison signal indicates the first signal is larger than the first threshold signal in magnitude, and generating the switch signal to turn off the switch if the first detection signal indicates the first signal is smaller than the second threshold signal in magnitude. For example, the method is implemented according to FIG. 6(A).

According to yet another embodiment, a method for protecting a power converter includes receiving a first signal, a first threshold signal, and a second threshold signal. The first signal is associated with an input current for a power converter, and the second threshold signal is different from the first threshold signal in magnitude. Additionally, the method includes generating a first comparison signal based on at least information associated with the first signal and the first threshold signal, generating a second comparison signal based on at least information associated with the first signal and the second threshold signal, receiving the second comparison signal, detecting, with or without a predetermined delay of time, the second comparison signal only if one or more predetermined conditions are satisfied, processing information associated with the detected second comparison signal, and generating a first detection signal based on at least information associated with the corresponding detected second comparison signal before the predetermined delay of time. Moreover, the method includes processing information associated with the first comparison signal and the first detection signal, and generating a switch signal for controlling a switch for adjusting the input current for the power converter based on at least information associated with the first comparison signal and the first detection signal. The process for generating a switch signal for controlling a switch includes generating the switch signal to turn off the switch if the first comparison signal indicates the first signal is larger than the first threshold signal in magnitude, and generating the switch signal to turn off the switch if the first detection signal indicates the first signal is smaller than the second threshold signal in magnitude before the predetermined delay of time. For example, the method is implemented according to FIG. 6(B), FIG. 8(A), FIG. 8(B), and/or FIG. 11.

In another example, as shown in FIG. 8(A) and/or FIG. 8(B), the process for detecting, with or without a predetermined delay of time, the second comparison signal includes detecting, without the predetermined delay of time, the second comparison signal only if the one or more predetermined conditions are satisfied. Additionally, as shown in FIG. 8(A) and/or FIG. 8(B), the process for processing information associated with the detected second comparison signal includes delaying the detected second comparison signal by the predetermined delay of time, and the process for generating a first detection signal includes generating the first detection signal based on at least information associated with the corresponding delayed detected second comparison signal before the predetermined delay of time according to one embodiment.

In yet another example, as shown in FIG. 11, the process for detecting, with or without a predetermined delay of time, the second comparison signal includes detecting with the predetermined delay of time the second comparison signal only if the one or more predetermined conditions are satisfied. Moreover, as shown in FIG. 11, the process for processing information associated with the detected second comparison signal includes processing information associated with the detected delayed second comparison signal, and the process for generating a first detection signal includes generating the first detection signal based on at least information associated with the corresponding detected delayed second comparison signal before the predetermined delay of time according to another embodiment.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for protecting a power converter, the system comprising:
    a first comparator configured to receive a first threshold signal and a first signal and to generate a first comparison signal, the first signal being associated with an input current for a power converter;
    a second comparator configured to receive a second threshold signal and the first signal and to generate a second comparison signal, the second threshold signal being different from the first threshold signal in magnitude;
    a detection and delay component configured to receive at least the second comparison signal, detect, with or without a predetermined delay of time, the second comparison signal only if one or more predetermined conditions are satisfied, process information associated with the detected second comparison signal, and generate a first detection signal based on at least information associated with the corresponding detected second comparison signal before the predetermined delay of time;
    a switch signal generator coupled to at least the detection and delay component and configured to generate a switch signal for controlling a switch for adjusting the input current for the power converter based on at least information associated with the first comparison signal and the first detection signal;
    wherein:
        the switch signal generator is further configured to generate the switch signal to turn off the switch if the first comparison signal indicates the first signal is larger than the first threshold signal in magnitude;
        the switch signal generator is further configured to generate the switch signal to turn off the switch if the first detection signal indicates the first signal is smaller than the second threshold signal in magnitude before the predetermined delay of time;

wherein the detection and delay component includes a deglitch component and a latch component, the latch component being coupled, directly or indirectly, to the deglitch component;

wherein:
the deglitch component is configured to cause the predetermined delay of time;
the latch component is configured to generate the first detection signal; wherein:
the detection and delay component further includes a timer component coupled to the latch and configured to receive the first detection signal;
the timer component is further configured to, if the first detection signal indicates the first signal is smaller than the second threshold signal in magnitude before the predetermined delay of time, output a reset signal to the latch component after a predetermined period of time.

2. The system of claim 1 wherein the latch component is further configured to, in response to the reset signal, reset the first detection signal so that the first detection signal does not cause the switch signal to turn off the switch.

3. The system of claim 1 wherein the second threshold signal is smaller than the first threshold signal in magnitude.

4. The system of claim 1 wherein the second threshold signal is a periodic signal and increases from a first magnitude to a second magnitude within each signal period.

5. The system of claim 1 wherein the detection and delay component is further configured to receive a clock signal and detect, with or without the predetermined delay of time, the second comparison signal only if the clock signal is at one or more falling edges.

6. The system of claim 1 wherein the detection and delay component is further configured to receive a clock signal and detect, with or without the predetermined delay of time, the second comparison signal only if the clock signal is at one or more falling edges or at a logic low level.

7. The system of claim 1 wherein the switch signal generator includes a pulse-width-modulation component and a gate driver.

8. The system of claim 7 wherein the pulse-width-modulation component includes a pulse-width-modulation comparator and a logic controller.

9. The system of claim 7 wherein:
the pulse-width-modulation component is configured to receive the first comparison signal and output a modulation signal;
the gate driver is configured to receive the modulation signal and the first detection signal and generate the switch signal based on at least information associated with the modulation signal and the first detection signal.

10. The system of claim 1 wherein the detection and delay component is further configured to receive at least the second comparison signal, detect without the predetermined delay of time the second comparison signal only if the one or more predetermined conditions are satisfied, delay the detected second comparison signal by the predetermined delay of time, and generate the first detection signal based on at least information associated with the corresponding delayed detected second comparison signal before the predetermined delay of time.

11. The system of claim 1 wherein the detection and delay component is configured to receive at least the second comparison signal, detect with the predetermined delay of time the second comparison signal only if the one or more predetermined conditions are satisfied, process information associated with the detected delayed second comparison signal, and generate the first detection signal based on at least information associated with the corresponding detected delayed second comparison signal before the predetermined delay of time.

* * * * *